(12) United States Patent
Utsumi et al.

(10) Patent No.: US 7,684,005 B2
(45) Date of Patent: *Mar. 23, 2010

(54) ACTIVE MATRIX TYPE LIQUID CRYSTAL DISPLAY APPARATUS

(75) Inventors: Yuka Utsumi, Hitachi (JP); Katsumi Kondo, Hitachinaka (JP); Ikuo Hiyama, Hitachi (JP); Osamu Itoh, Hitachi (JP); Masahito Ohe, Mobara (JP); Kazuhiko Yanagawa, Mobara (JP); Keiichiro Ashizawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/244,181

(22) Filed: Oct. 2, 2008

(65) Prior Publication Data

US 2009/0040438 A1 Feb. 12, 2009

Related U.S. Application Data

(63) Continuation of application No. 11/299,699, filed on Dec. 13, 2005, now Pat. No. 7,433,012, which is a continuation of application No. 10/629,711, filed on Jul. 30, 2003, now Pat. No. 7,209,211, which is a continuation of application No. 09/572,375, filed on May 18, 2000, now Pat. No. 6,621,538, which is a continuation of application No. 08/740,008, filed on Oct. 23, 1996, now Pat. No. 6,137,560.

(30) Foreign Application Priority Data

Oct. 23, 1995 (JP) .................................. 7-273921
May 9, 1996 (JP) .................................. 8-114739

(51) Int. Cl.
*C09K 19/02* (2006.01)

(52) U.S. Cl. ...................................................... 349/177
(58) Field of Classification Search ................... 349/177
See application file for complete search history.

(56) References Cited

U.S. PATENT DOCUMENTS 4,345,249 A 8/1982 Togashi (Continued)

FOREIGN PATENT DOCUMENTS

JP 63-21907 5/1988

(Continued)

OTHER PUBLICATIONS

Nitta et al High Quality Super-IPS LCD System For Moving Picture, AM-LCD '03 pp. 253-256.

(Continued)

*Primary Examiner*—James A Dudek
(74) *Attorney, Agent, or Firm*—Antonelli, Terry, Stout & Kraus, LLP.

(57) ABSTRACT

A liquid crystal display apparatus includes a liquid crystal panel having polarizers, and a back light having a light source for illumination of the liquid crystal panel which has a characteristic of spectral transmittance required to satisfy the following equation, x>y>z, when a medium tone display voltage varies in a range between a minimum and maximum voltage for a Blue pixel, where "x" is a value of the transmittance in the panel at a wavelength corresponding to a longest wavelength in a range of wavelengths designated for blue light, "y" is a value of the transmittance in the panel at a wavelength corresponding to a maximum value of the intensity in a range of wavelengths designated for green light, and "z" is a value of the transmittance in the panel at a wavelength corresponding to a maximum value of the intensity in a range of wavelengths designated for red light.

3 Claims, 27 Drawing Sheets

U.S. PATENT DOCUMENTS

| | | | |
|---|---|---|---|
| 4,550,436 | A | 10/1985 | Freeman |
| 4,632,514 | A | 12/1986 | Ogawa et al. |
| 4,697,884 | A | 10/1987 | Amstutz |
| 4,909,604 | A | 3/1990 | Kobayashi |
| 4,973,137 | A | 11/1990 | Kozaki |
| 5,048,933 | A | 9/1991 | Asano |
| 5,089,906 | A | 2/1992 | Ohnishi |
| 5,119,216 | A | 6/1992 | Wada |
| 5,124,825 | A | 6/1992 | Asano |
| RE33,987 | E | 7/1992 | Suzawa |
| 5,130,834 | A | 7/1992 | Kano |
| 5,132,825 | A | 7/1992 | Miyadera |
| 5,139,340 | A | 8/1992 | Okumura |
| 5,211,463 | A | 5/1993 | Kalmanash |
| 5,414,542 | A | 5/1995 | Kawagishi |
| 5,532,854 | A | 7/1996 | Fergason |
| 5,541,750 | A | 7/1996 | Seong |
| 5,745,200 | A | 4/1998 | Kikuchi |
| 5,757,524 | A | 5/1998 | Rupp |
| 5,841,498 | A | 11/1998 | Baur et al. |
| 7,209,211 | B2 * | 4/2007 | Utsumi et al. ............... 349/177 |

FOREIGN PATENT DOCUMENTS

| | | |
|---|---|---|
| JP | 02-013926 | 1/1990 |
| JP | 3-233518 | 10/1991 |
| JP | 03-233518 | 10/1991 |
| JP | 04-057011 | 2/1992 |
| JP | 04-181219 | 6/1992 |
| JP | 4-181219 | 6/1992 |
| JP | 6-222397 | 8/1994 |
| JP | 08-082715 | 3/1996 |
| JP | 08-094848 | 4/1996 |
| JP | 08-095015 | 4/1996 |
| JP | 08-106010 | 4/1996 |
| JP | 08-068997 | 6/1996 |
| WO | 91/10936 | 7/1991 |

OTHER PUBLICATIONS

Utsumi "Color Tracking In Relation To Liquid Crystal Display Characteristics", Asia Display IDS '01 pp. 117-120.

Utsumi et al "Development of Authentic-Color IPS LCD without Color Tracking", SID 02 Digest, pp. 820-823.

Utsumi, "Improving Color Tracking In In-Plane Switching Mode Liquid-Crystal Displays", MRS Bulletin. Nov. 2002, pp. 1-4.

Liquid Crystal Applications and Uses, vol. 1, pp. 188-194, 261-267, 1990 Bahadur.

Electronic Display Devices, Masumoto et al, 1990, pp. 70-72.

* cited by examiner

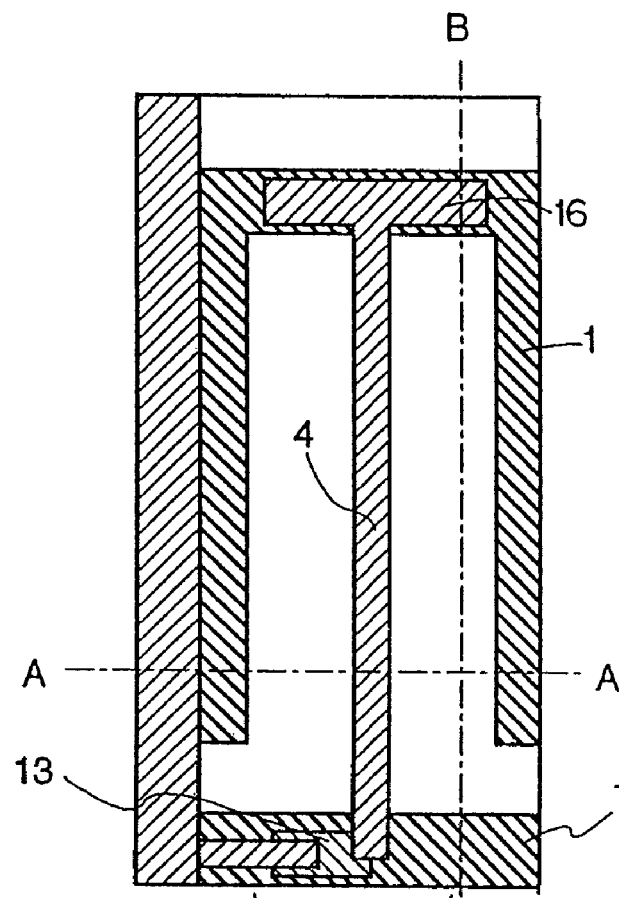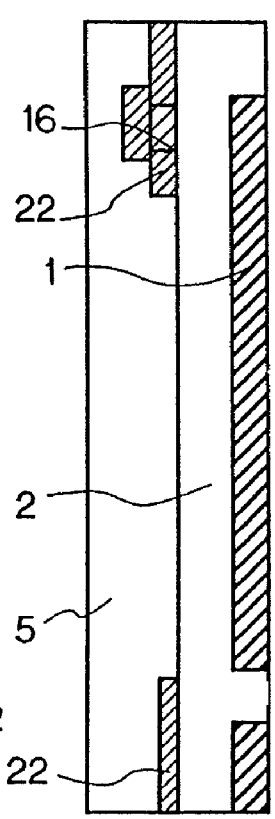

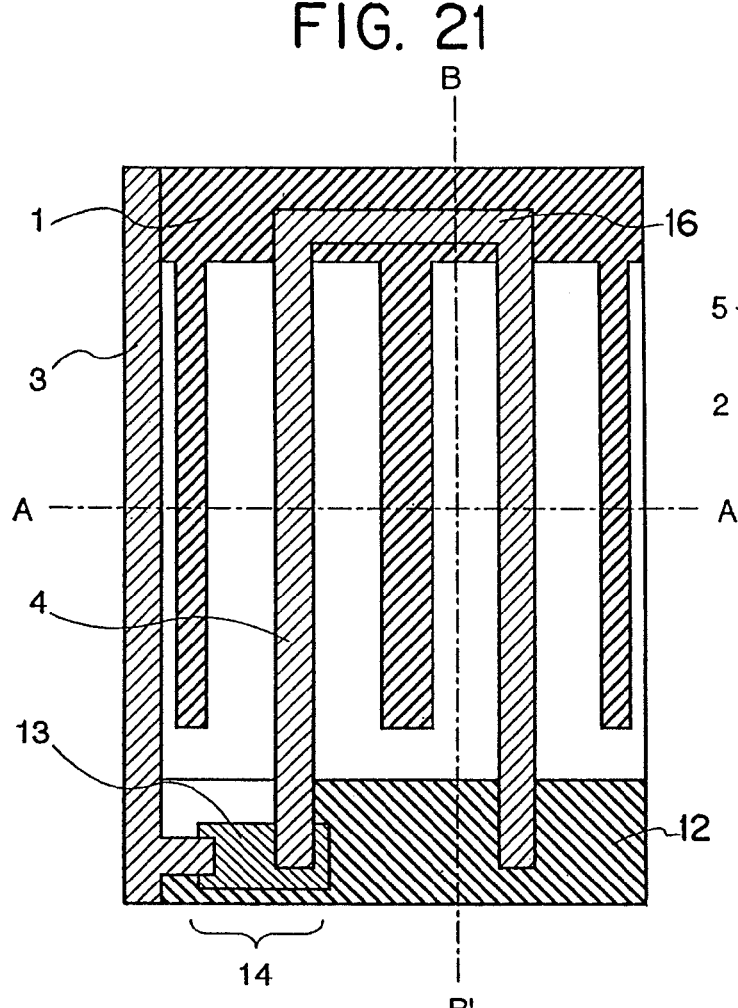
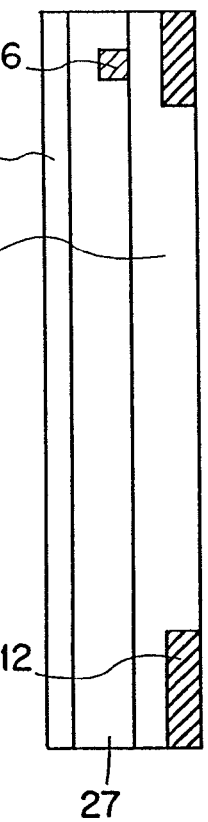
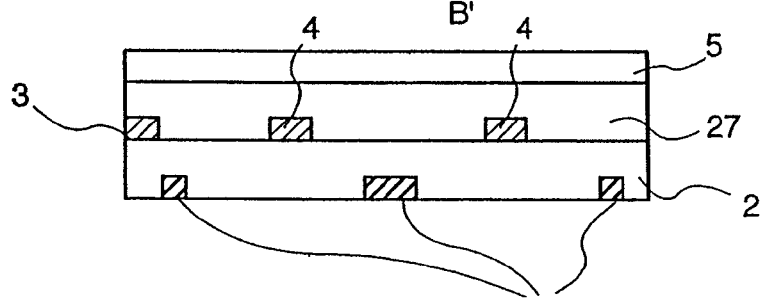
FIG. 21
FIG. 21(b)
FIG. 21(a)

FIG. 22
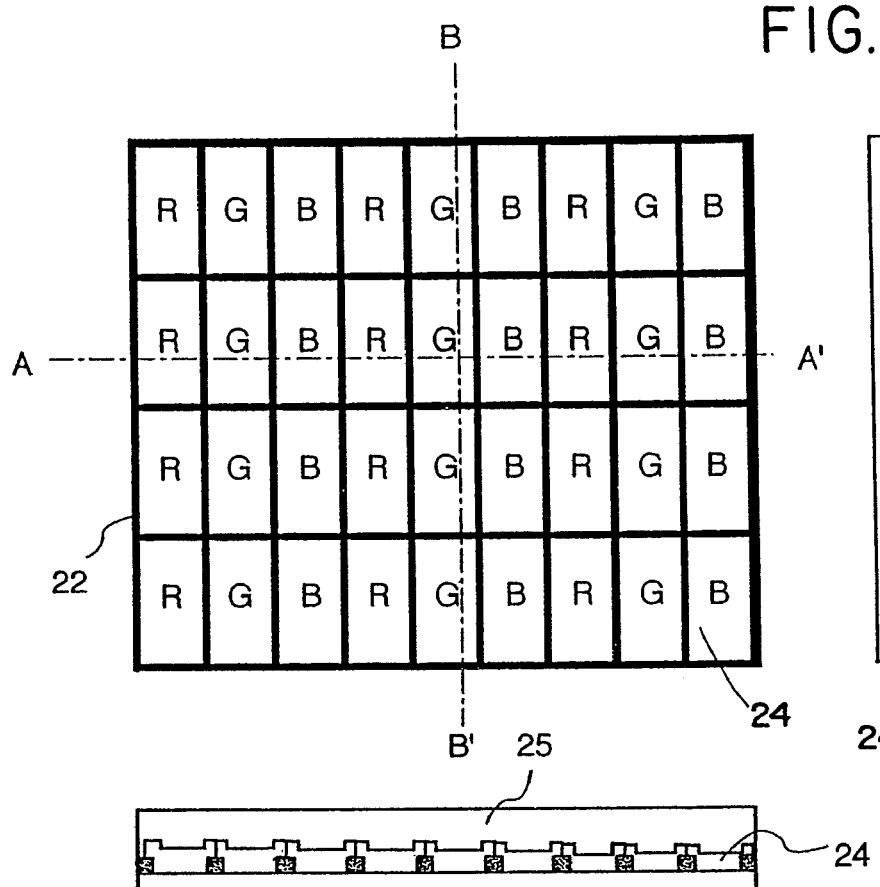
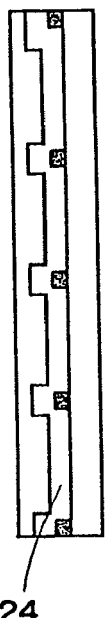
FIG. 22(b)
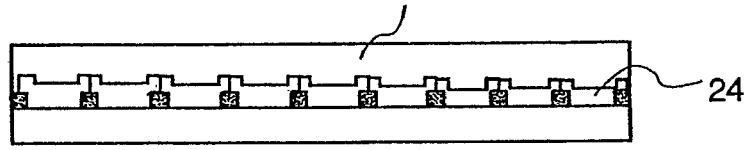
FIG. 22(a)

λ (nm)

APPLIED VOLTAGE

US 7,684,005 B2

ACTIVE MATRIX TYPE LIQUID CRYSTAL DISPLAY APPARATUS

CROSS REFERENCE TO RELATED APPLICATION

This is a continuation of U.S. application Ser. No. 11/299,699, filed Dec. 13, 2005, now U.S. Pat. No. 7,433,012, which is a continuation of U.S. application Ser. No. 10/629,711, filed Jul. 30, 2003, now U.S. Pat. No. 7,209,211, which is a continuation of U.S. application Ser. No. 09/572,375, filed May 18, 2000, now U.S. Pat. No. 6,621,538, which is a continuation of U.S. application Ser. No. 08/740,008, filed Oct. 23, 1996, now U.S. Pat. No. 6,137,560, the subject matter of which is incorporated by reference herein.

BACKGROUND OF THE INVENTION

The present invention relates to a liquid crystal display apparatus, and, more particularly, to an active matrix liquid crystal display apparatus.

Various examples of liquid crystal display apparatus are disclosed, for example, in Japanese Patent Publication No. 63-21907 (1988), UP, WO91/10936 and Japanese Patent Application Laid-Open No. 6-222397 (1994), in which a pair of comb electrodes are used to apply an electric field to a liquid crystal in a direction parallel to the surface of a substrate. However, in a display system of this type wherein the direction of an electric field applied to the liquid crystal is controlled to be parallel with the surface of a substrate by using active elements (hereinafter referred to as a horizontal electric field type), no consideration is given to the characteristic of the light source required to decrease the power consumption of the whole liquid crystal display apparatus. Further, no consideration is given to the configuration of the liquid crystal display apparatus required to suppress color shift in response to the application of a voltage thereto and to prevent a color defect s from occurring.

In the establishment of a horizontal electric field, opaque electrodes are provided in a display pixel portion in order to produce an electric field substantially in parallel with the surface of the substrate. As compared with the prior art type of display panel wherein an electric field is applied in a direction substantially vertical to the surface of the substrate by using a transparent electrode, the aperture ratio may be deteriorated and the brightness under a bright state may be reduced. Accordingly, it is necessary to use a high-intensity light source in the horizontal electric field producing type of display panel.

Because the display mode effective for a liquid crystal display apparatus of the horizontal electric field type is a double refraction mode, the transmittance T can be generally expressed by the following equation (1):

$$T = T_0 \sin^2 2\theta \cdot \sin^2\left(\frac{nd\Delta n}{\lambda}\right) \quad (1)$$

where, $T_0$ designates a coefficient and is determined mainly by the transmittance of the polarizer used in the liquid crystal panel, $\theta$ designates the angle between an effective optical axis in the liquid crystal layer and a transmittance axis for polarized light, d designates the thickness of the liquid crystal layer, $\Delta n$ designates the anisotropy of the refractive index of the liquid crystal layer, and $\lambda$ denotes the wavelength of light. Because the transmittance of the liquid crystal display apparatus has essentially a maximum value at a certain wavelength, the liquid crystal display elements are colored. One solution to the above equation is a value which satisfies a condition wherein the peak wavelength becomes equal to the maximum wavelength 555 nm for luminous efficiency under a retardation of 0 order, that is, $(\pi d \cdot \Delta n/555) = \pi/2$. In this case, the transmittance falls suddenly on the short wavelength side of the peak wavelength, and it decreases gradually on the long wavelength side. Therefore, the liquid crystal display elements are colored yellow. As a result, it is required to use a light source with the color of a cold color family which represents a complementary color to yellow. In other words, it is required to use a light source with a high color-temperature characteristic.

In general, a fluorescent lamp is used as a light source for a liquid crystal display apparatus. Because the luminous efficiency of the fluorescent lamp in a short wavelength region is less than that in a long wavelength region, the brightness may be reduced, and so a large consumption of power is required to obtain a high brightness. Since the normal voltage of the battery must be maintained for a long time, for example, in a note book type personal computer or personal digital assistance, it is required to avoid any increase in the power consumption.

Now, the display operation of a liquid crystal display apparatus of the horizontal electric field type can be obtained in the double refraction mode, and the transmittance T can be generally expressed by the following equation (2):

$$T = T_0 \cdot \sin^2 2\theta \cdot \sin^2[(\pi \cdot d_{\mathit{eff}} \cdot \Delta n)/\lambda] \quad (2)$$

where, $T_0$ designates a coefficient and is determined mainly by the transmittance of the polarizer used in the liquid crystal panel, $\theta$ designates the angle between an effective optical axis in the liquid crystal layer and a transmittance axis for polarized light, $d_{\mathit{eff}}$ designates the thickness of the liquid crystal layer, $\Delta$ denotes the anisotropy of the refractive index of the liquid crystal layer, and $\lambda$ designates the wavelength of light. Further, the product of $d_{\mathit{eff}}$ and $\Delta$ is referred to as retardation. Here, the thickness $d_{\mathit{eff}}$ of the liquid crystal layer is not the thickness of the whole liquid crystal layer, but the thickness of the liquid crystal layer in which the direction of alignment is changed when a voltage is applied.

In general, the molecules of the liquid crystal in the vicinity of the boundary surface of a liquid crystal layer do not change the alignment direction due to the effect of anchoring at the boundary surface even if a voltage is applied. Accordingly, when the thickness of the whole liquid crystal layer sandwiched between the substrates equals $d_{\mathit{eff}}$, $d_{\mathit{eff}} < d_{LC}$ always is maintained between the thickness $d_{LC}$ and $d_{\mathit{eff}}$. It is estimated that the difference between $d_{LC}$ and $d_{\mathit{eff}}$ equals about 20 nm to 40 nm.

As clearly seen from the above equation (2), the transmittance of the liquid crystal display panel takes a maximum value at a specific wavelength (peak wavelength). Therefore, the liquid crystal display element is easily colored, in other words, it is easy to be unnecessarily colored.

Generally, the liquid crystal panel is constructed so that the peak wavelength may become equal to the maximum wavelength 555 nm for luminous efficiency, that is, $(\pi d \cdot \Delta n/555) = \pi/2$ At this time, the liquid crystal display element is colored yellow, because the spectral transmittance falls suddenly on the short wavelength side of the peak wavelength, and it decreases gradually on the long wavelength side.

The extent of coloring extremely changes with the application of a voltage to the liquid crystal. As the magnitude of the voltage value changes from the minimum voltage required for display to the medium tone display voltage and then to the maximum voltage, the color tone is gradually changed. Therefore, the display state of colors is extremely deteriorated.

Because the difference between the thickness of the liquid crystal layers appears as a change in the peak wavelength in the birefringence mode, the local and abnormal thickness of the liquid crystal display layer causes display defects, such as variations in the intensity and/or color tone, which are different from those in its surrounding area.

SUMMARY OF THE INVENTION

An object of the present invention is to provide an improved liquid crystal display apparatus, in which a low power consumption and a fine display characteristic are compatible with each other.

Another object of the present invention is to provide an improved liquid crystal display apparatus which can suppress color shift caused by the application of a voltage and reduce the occurrence of a color defect due to a local difference in thickness in the liquid crystal layer.

A liquid crystal display apparatus according to the present invention comprises a liquid crystal panel having a pair of substrates, a plurality of electrodes formed on at least one of said pair of electrodes and a liquid crystal layer sandwiched between said pair of substrates, and a light source provided on one surface of said liquid crystal panel. The light source has a luminous characteristic with the chromaticity of a warm color family and said liquid crystal panel has a characteristic of spectral transmittance with the chromaticity of a cold color family. Thereby, the color of said light source can be compensated.

The warm color family includes colors with a reddish hue, such as yellow or orange, in contradistinction with "white" illuminated from the standard illuminant C. The cold color family includes colors with a bluish hue in contradistinction with "white" illuminated from the standard illuminant C. While an illuminant with a color of the warm color family has a transmittance which is low at a shorter wavelength, for an illuminant with a color of the cold color family, the transmittance is low at a longer wavelength. Therefore, by combining them, it becomes possible to transmit light almost uniformly in the visible region. As a result, the display of the whole liquid crystal display apparatus approaches "white", as illuminated from the standard illuminant C.

The reason why the power consumption is reduced by using the present invention is as follows. The fluorescent lamp with a color of the warm color family tends to consume less electric power than one with a color of the cold color family while obtaining the same intensity. In general, it is assumed that the power consumption of a fluorescent lamp with a color temperature of 6000K is 1, the power consumption required to obtain the same intensity results in a 5% increase in a fluorescent lamp with a color temperature of 8000K and a 10% increase in one with a temperature of 10000K, but a 5% decrease in one with a temperature of 4000K. For example, in order to compensate the color in a liquid crystal display element colored in yellow, by using a fluorescent lamp with a color temperature more than the 6770K of the white standard illuminant C, it is necessary to use an illuminant with a color temperature of preferably more than 10000K. For example, if an electric power of 2 watts is consumed by using a fluorescent lamp with a color temperature of 8700K in the liquid crystal display apparatus of the horizontal electric field type, an electric power of 2.06 watts is consumed when a fluorescent lamp with a color temperature of 10000K is used. However, if the fluorescent lamp with a color temperature of 6000K lower than that of the white standard illuminant C is used, the power consumption is 1.87 watts, and if one with 4000K is used, it becomes 1.79 watts.

The illuminant with a color of the warm color family may be made by changing the kind of fluorescent materials being used and their mixing ratio. A narrow band emission type fluorescent lamp can be made by mixing the materials selected from each of the following A, B and C groups. The A group has an emission peak in the range of 450 nm to 490 nm, and includes the following materials:

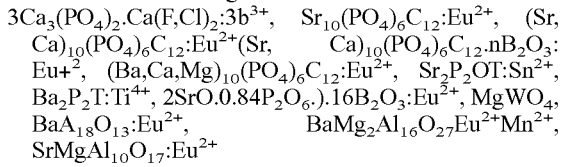

The B group has an emission peak in the range of 540 nm to 550 nm, and includes the following materials:

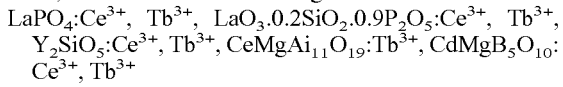

The C group has an emission peak in the vicinity of 610 nm, and includes the following materials:

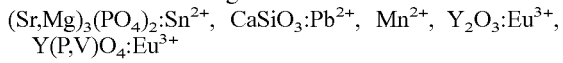

By changing the mixing ratio, it becomes possible to control the relative intensity of each of the emission regions, and thus realize a fluorescent lamp with various color temperatures. Further, by increasing the mixing ratio of the fluorescent materials having an emission peak around 610 nm, it becomes possible to make a fluorescent lamp with a lower color temperature in the warm color family.

There are three methods to realize a liquid crystal display apparatus of the cold color family.

(1) A characteristic of the cold color family can be obtained by positioning the maximum value of the transmittance in a short wavelength area. The luminescence spectrum of the fluorescent material corresponding to green resides in the range of 540 nm to 550 nm, and that corresponding to blue in the range of 450 nm to 490 nm. It is, therefore, possible to obtain a liquid crystal display apparatus of the cold color family when the maximum luminescence spectrum is less than 520 nm, that is, when $d \cdot \Delta n = 0.26$ in the equation (1), because the blue color is emphasized in such a case. Here, d denotes the thickness ($d_{eff}$) of the liquid crystal layer which changes the direction of alignment when a voltage is applied. The molecules of the liquid crystal in the vicinity of the boundary surface of the liquid crystal layer does not change the direction of alignment due to the effect of anchoring of the boundary surface even when a voltage is applied. When the thickness of the liquid crystal layer sandwiched between the substrates is $d_{LC}$, the thickness of the liquid crystal layer which changes the direction of alignment when a voltage is applied is $d_{eff}$, $d_{eff} < d_{LC}$ and the difference between $d_{eff}$ and $d_{LC}$ may be about from 300 nm to 400 nm.

(2) The liquid crystal display panel may be provided with a birefringent film, which is set so as that the peak wavelength of the spectrum transmittance in the liquid crystal display panel can be within the short wavelength range of the visible light of 400 nm to 520 nm, preferably 440 nm to 490 nm.

(3) The liquid crystal display panel may be provided with a color filter. The thickness of the liquid crystal layer at a portion where red light can be transmitted is less than the thickness $d_{LC}$ of the liquid crystal layer at a portion where green light or blue light can be transmitted.

The threshold voltage Ec in the liquid crystal display apparatus is expressed by the following equation:

$$Ec = \frac{\Pi}{d_{LC}} \sqrt{\frac{K_2}{\varepsilon o \Delta \varepsilon}} \quad (3)$$

where, $d_{LC}$ designates the thickness of the liquid crystal layer, $K_2$ represents an elastic constant, $\Delta \in$ designates the anisotropy of a dielectric constant of the liquid crystal, and $\in$ denotes a dielectric constant for a vacuum. As $d_{LC}$ is reduced, the threshold voltage shifts to a higher voltage. By setting the thickness of the liquid crystal to be thin at a pixel portion where red is displayed, it becomes possible to shift red, that is, a voltage-transmittance characteristic in a long wavelength region to a higher voltage side. Thereby, the transmittance at the long wavelength region for each voltage is suppressed, and thus it becomes possible to make a liquid crystal display apparatus in which the transmittance in the short wavelength region is larger. In order to suppress sufficiently the transmittance in the high wavelength region and hold a color balance, it is preferable that the change in thickness of the liquid crystal is suppressed within the range of 0.1 µm to 1 µm. For example, it is possible to reduce $d_{LC}$ by thickening the film at a portion of the color filter where red is displayed. It may be possible to thicken the film at a portion of the color filter where blue is displayed more than $d_{LC}$ at portions lo where red and green are displayed. Also, in this case, it is preferable that the change in the thickness of the liquid crystal layer is within the range of 0.1 µm to 15 µm.

The illuminant used in accordance with the present invention has a maximum value of at least one intensity in each range from 400 nm to 500 nm, from 500 nm to 600 nm and from 600 nm to 700 nm of said light source, and the liquid crystal panel has a characteristic of spectral transmittance required to satisfy the relation, x>y>z, where x equals a value of the transmittance at the wavelength which shows the maximum value of the intensity in the range from 400 nm to 500 nm, y denotes a value of the transmittance at the wavelength which shows the maximum value of the intensity in the range from 500 nm to 600 nm, and z denotes a value of the transmittance at the wavelength which shows the maximum value of the intensity in the range from 600 nm to 700 nm. Thus, it is possible to suppress the color shift caused by the change in the applied voltage and to provide a liquid crystal display apparatus having a fine display characteristic.

The reason why a fine display characteristic can be obtained will be explained hereinafter.

As described above, the liquid crystal display apparatus is generally operated in a birefringent mode. Its transmittance is expressed in the equation (2). Accordingly, the liquid crystal display apparatus has a spectral transmittance which has its maximum value at a certain wavelength, suddenly decreases on the shorter wavelength side, and gradually decreases on the longer wavelength side. It is assumed that the peak wavelength is around 550 nm. The transmittance suddenly decreases in the range of 400 nm to 500 nm, which is in a blue region. As the brightness of the liquid crystal panel increases, the dependence of the transmittance on the wavelength becomes remarkable. Accordingly, this is the factor which causes the color shift according to a change in the applied voltage.

When the thickness of the liquid crystal layer at a certain portion is locally different from other portions in the liquid crystal display apparatus, the transmittance of blue at the portion remarkably changes and a color defect may occur. Accordingly, it should be noted that it is important to suppress any sudden decrease of the transmittance in the short wavelength region of the peak wavelength or the blue region. In order to suppress a sudden decrease of the transmittance in the short wavelength region, it is effective to shift the peak wavelength to the short wavelength side by setting the wavelength $\lambda$ to be shorter than 550 nm under the condition of $d_{eff} \cdot \Delta n(\lambda) = \lambda/2$.

The more the wavelength $\lambda$ is spaced from the peak wavelength, the more the extent of the decrease of the transmittance increases. It is, therefore, possible to suppress a sudden decrease of the transmittance in the short wavelength region by setting the peak wavelength to the shorter wavelength side. It is also important to suppress a sudden decrease of the transmittance at the wavelength of emission from the illuminant being used.

In general, a narrow band emission type fluorescent lamp is used for the illuminant of the liquid crystal display apparatus. Such a fluorescent lamp uses materials which have a luminescence peak at each spectrum region of red (R), green (G) and blue (B).

The following group has an emission peak in the range of 450 nm to 490 nm corresponding to blue, and includes the following materials:

$3Ca_3(PO_4)_2 \cdot Ca(F,Cl)_2 : 3b^{3+}$, $Sr_{10}(PO_4)_6 C_{12} : Eu^{2+}$, $(Sr, Ca)_{10}(PO_4)_6 C_{12} : Eu^{2+}$, $(Sr, Ca)_{10}(PO_4)_6 C_{12}$ $nB_2O_3 : Eu+^2$, $(Ba,Ca,Mg)_{10}(PO_4)_6 C_{12} : Eu^{2+}$, $Sr_2P_2O_7 : Sn^{2+}$, $Ba_2P_{27} : Ti^{4+} 2SrO \cdot 0.84P_2O_6.).16B_2O_3 : Eu^{2+}$, $MgWO_4$, $BaA_{18}O_{13} : Eu^{2+}$, $BaMg_2Al_{16}O_{27} : Eu^{2+}Mn^{2+}$, $SrMgAL_{10}O_{17} : Eu^{2+}$ The following group has an emission peak in the range of 540 nm to 550 nm corresponding to green, and includes the following materials:

$LaPO_4 : Ce^{3+}$, $Tb^{3+}$, $LaO_3 0.2SiO_2 \cdot 0.9P_2O_5 : Ce^{3+}$, $Tb^{3+}$, $Y_2SiO_5 : Ce^{3+}$, $Tb^{3+}$, $CeMgAi_{11}O_{19} : Tb^{3+}$, $CdMgB_5O_{10} : Ce^{3+}$, $Tb^{3+}$ The following C group has an emission peak in the range of 610 nm to 630 nm corresponding to red, and includes the following materials:

$(Sr,Mg)_3(PO_4)_2 : Sn^{2+}$, $CaSiO_3 : Pb^{2+}$, $Mn^{2+}$, $Y_2O_3 : Eu^{3+}$, $Y(P,V)O_4 : Eu^{3+}$

The luminescence characteristic of the narrow band emission type fluorescent lamp made with fluorescent materials selected from each of the above groups is as follows. The spectrum corresponding to blue is within the range of 450 nm to 490 nm, the spectrum corresponding to green is in the vicinity of 545 nm, and the spectrum corresponding to red is within the range of 610 nm to 630 nm.

Therefore, the characteristic of the spectrum transmittance which should be taken into consideration in the liquid crystal panel using the above narrow band emission type fluorescent lamp is as follows. It should have the range of 450 nm to 490 nm as a blue region, the range in the vicinity of 545 nm as a green region, and the range of 610 nm to 630 nm as a red region.

Accordingly, the most effective characteristic of the transmittance to suppress color shift and/or color defects in the liquid crystal panel has a maximum value in the wavelength region of 450 nm to 490 nm. The retardation $d_{eff} \cdot \Delta n(A)$ should be set to be less than 0.245 µm ($\lambda$=490 nm) to fit the peak of the transmittance to the above wavelength region. Further, it is necessary to use a liquid crystal material which has a small anisotropy Δn of refractive index and a thin liquid crystal layer to reduce the retardation $d_{eff} \cdot \Delta n$.

As described above, it is important to fit the characteristic of the luminescence at the short wavelength region of the illuminant to the peak of the transmittance of the liquid crystal panel. Here, the spectral transmittance does not mean the spectral characteristic after passing through a color filter, etc., but refers to the characteristic of the transmittance of the liquid crystal panel itself.

While the peak wavelength of the transmittance may change a little by using a certain color filter, it is possible to ignore its effect during actual use. The most important point in accordance with the present invention resides in the relationship between the peak of the intensity of the illuminant and the transmittance of the liquid crystal panel.

The magnitude of the anisotropy Δn of the refractive index of the liquid crystal changes according to temperature. If the temperature of the liquid crystal panel changes due to the environment of the place where the display apparatus is used, the set value of the retardation $d_{eff} \cdot \Delta n$ may change.

In a liquid crystal in which the anisotropy Δn of the refractive index is relatively small, the change in the anisotropy Δn itself of its refractive index becomes small. In addition, if the thickness $d_{eff}$ is also small, the change in the product $d_{eff} \cdot \Delta n$ of the thickness and the anisotropy becomes smaller. Accordingly, by using the above liquid crystal, it is possible to obtain an expansion of the margin of the temperature, and thus suppress any change in the retardation $d_{eff} \cdot \Delta n$.

BRIEF DESCRIPTION OF THE DRAWINGS

FIG. 14A shows a luminescence spectrum and FIG. 14B shows chromaticity coordinates concerning the construction members.

FIG. 20 is a cross-sectional view of a liquid crystal display panel of the horizontal electric field type, FIG. 20(a) is a view taken along line A-A' and FIG. 20(b) is a view taken along line B-B' in FIG. 20.

FIG. 21 is a cross-sectional view of a liquid crystal display panel of the horizontal electric field type, FIG. 21(a) is a view taken along line A-A' and FIG. 21(b) is a view taken along line B-B' in FIG. 21.

FIG. 22 is a diagram of a color filter according to an embodiment of the present invention, FIG. 22(a) is a view taken along line A-A' and FIG. 22(b) is a view taken along line B-B' in FIG. 22.

DESCRIPTION OF THE PREFERRED EMBODIMENTS

Embodiments of the liquid crystal display apparatus according to the present invention will be explained hereinafter with reference to the attached drawings.

Firstly, the configuration and the principle of operation of a liquid crystal display element of the horizontal electric field type will be explained with reference to FIG. 3, which illustrates the definition of the direction of rubbing and the direction of the axis of a polarizer.

Figure 3:
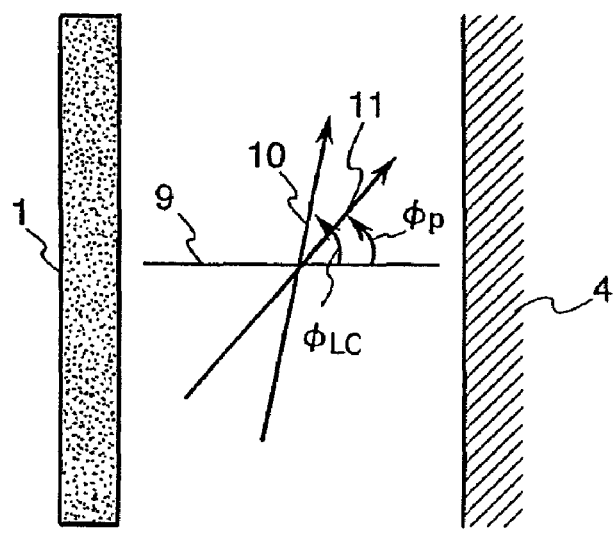
FIG. 3 is a diagram which shows the definition of a direction of rubbing and a direction of the axis of a polarizer.

In FIG. 3, reference numeral 1 designates a common electrode, 4 designates a pixel electrode, 9 designates the direction of an electric field, 10 denotes a longitudinal axis (optical axis) of a molecule of the liquid crystal, and 11 denotes the transmitting axis of polarized light. Further, ΦP designates an angle between the transmitting axis 11 and a polarizer 8 (see FIG. 1), and ΦLC designates an angle between the direction 9 of the electric field and the optical axis 10 in the vicinity of a boundary surface.

Because there are a pair of polarizers and a pair of boundary surfaces, respectively, an upper one and a lower one, the relevant angles are expressed as ΦP1, ΦP2, ΦLC1, and ΦLC2, respectively, if necessary. Further, the longitudinal axis 10 of the molecule of liquid crystal is oriented in the same direction as that of rubbing due to an alignment control film.

Secondly, the configuration and the principle of operation of a liquid crystal display panel of the horizontal electric field type will be explained with reference to FIGS. 4(a) to 4(c).

Figure 4A:
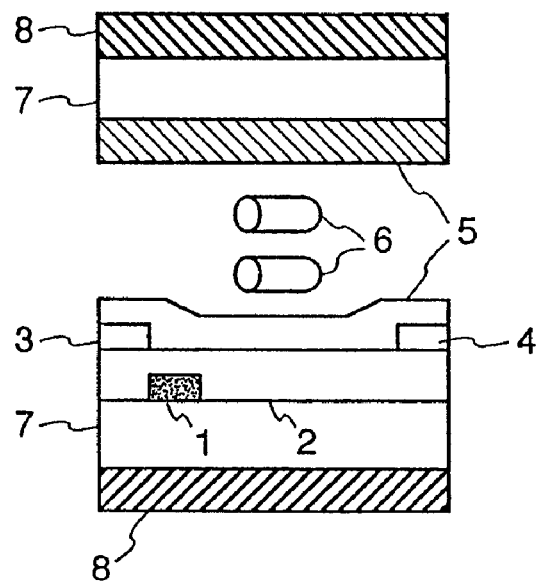
FIGS. 4(a) and 4(b) are side-sectional views each showing one pixel portion of the liquid crystal display panel of the horizontal electric field type.
Figure 4B:
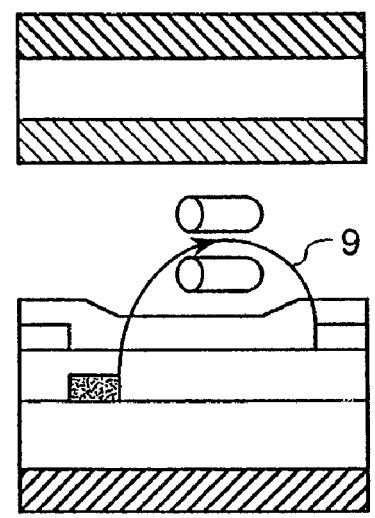
Figure 4C:
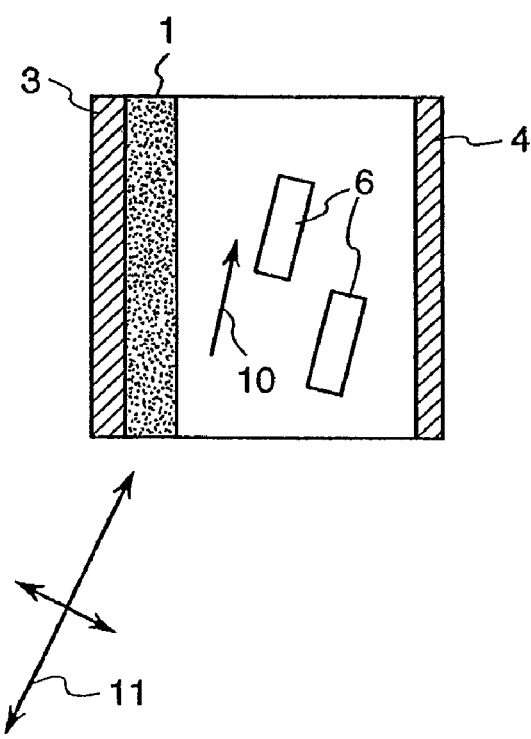
FIGS. 4(c) and 4(d) are front views of the panels of FIGS. 4(a) and 4(b), respectively, wherein active elements are not shown except a gate insulating film 2.
Figure 4D:
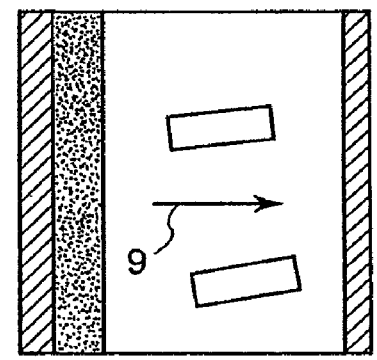
Figure 5:
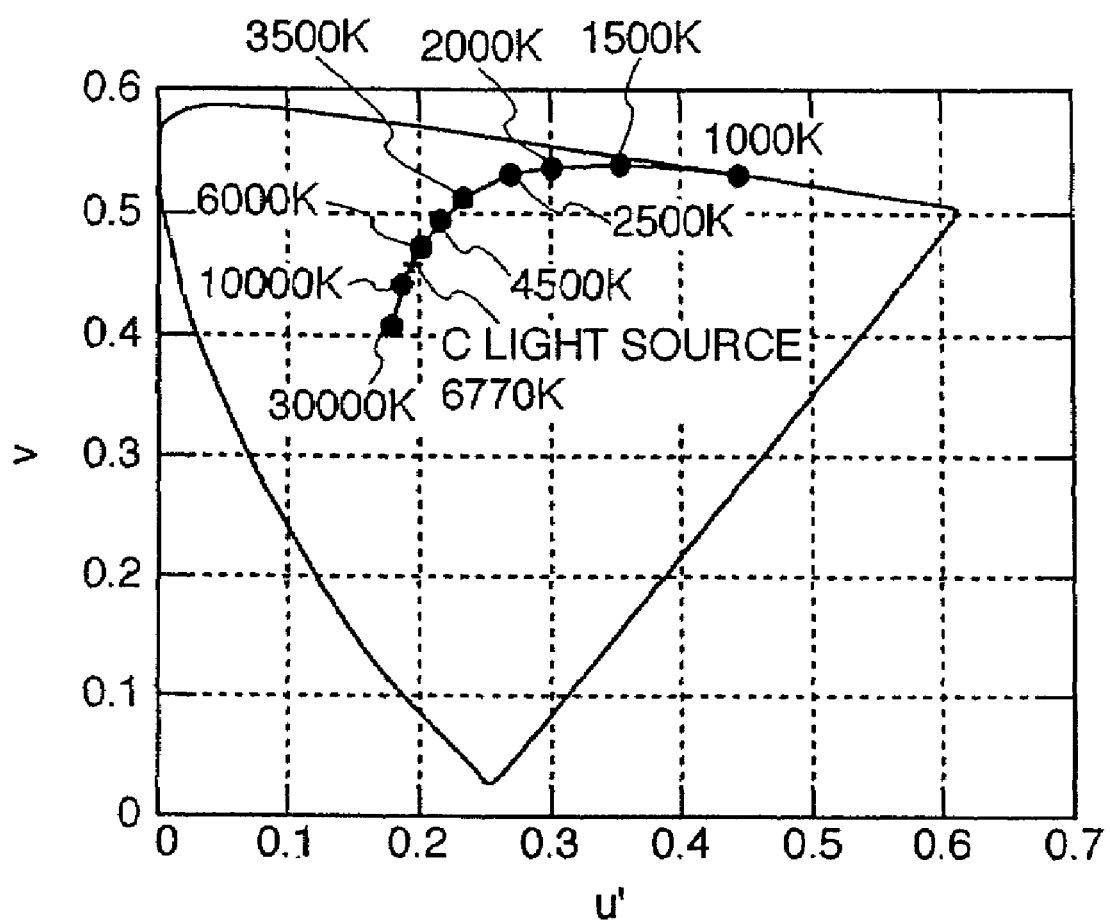
FIG. 5 is a graph which shows color temperatures and chromaticity coordinates.

FIGS. 4(a) and 4(b) are side-sectional views each showing one pixel portion of the liquid crystal display panel of the horizontal electric field type, and FIGS. 4(c) and 4(d) are front views thereof. In these figures, active elements are not shown, except for a gate insulating film 2. FIGS. 4(a) and 4(c) each show a state in which a voltage is not applied. Stripes of electrodes 1, 3 and 4 are formed inside a pair of substrates 7, and alignment control films 5 are formed on those electrodes and substrates. In addition, polarizers 8 are provided outside the substrates 7, and the transmitting axes thereof are shown in FIG. 4(c). Although the liquid crystal composite is sandwiched between the alignment control films 5, only the liquid crystal molecules 6 are shown in the figures. In this example, it is assumed that the dielectric anisotropy of the liquid crystal molecules is positive.

The molecules of liquid crystal are alignment-controlled according to a rubbing direction 10 of the alignment control film 5 when a voltage is not applied.

The angle ΦLC is controlled so as to satisfy the relation, 45°<|ΦLC|□90° in consideration of the dielectric positive anisotropy. In this example, the directions of alignment of the molecules of the liquid crystal on the upper and lower boundary surfaces are parallel to each other, namely, ΦLC1=ΦLC2.

When a voltage with a predetermined polarity is applied, and thus an electric field 9 is produced, the molecules of liquid crystal change their directions to align with the direction of the electric field 9, as shown in FIGS. 4(b) and 4(d). As a result, the transmittance of light can be controlled according to the magnitude of the applied voltage, with respect to the transmitting axis of the polarized light of the polarizer 8, and thereby information can be displayed on the liquid crystal display panel.

This operation may be normally performed even if the composition of the liquid crystal has a negative dielectric anisotropy. In this case, it should be noted that the state of original alignment must be set to 0°<|ΦLC|□45°.

Figure 1:
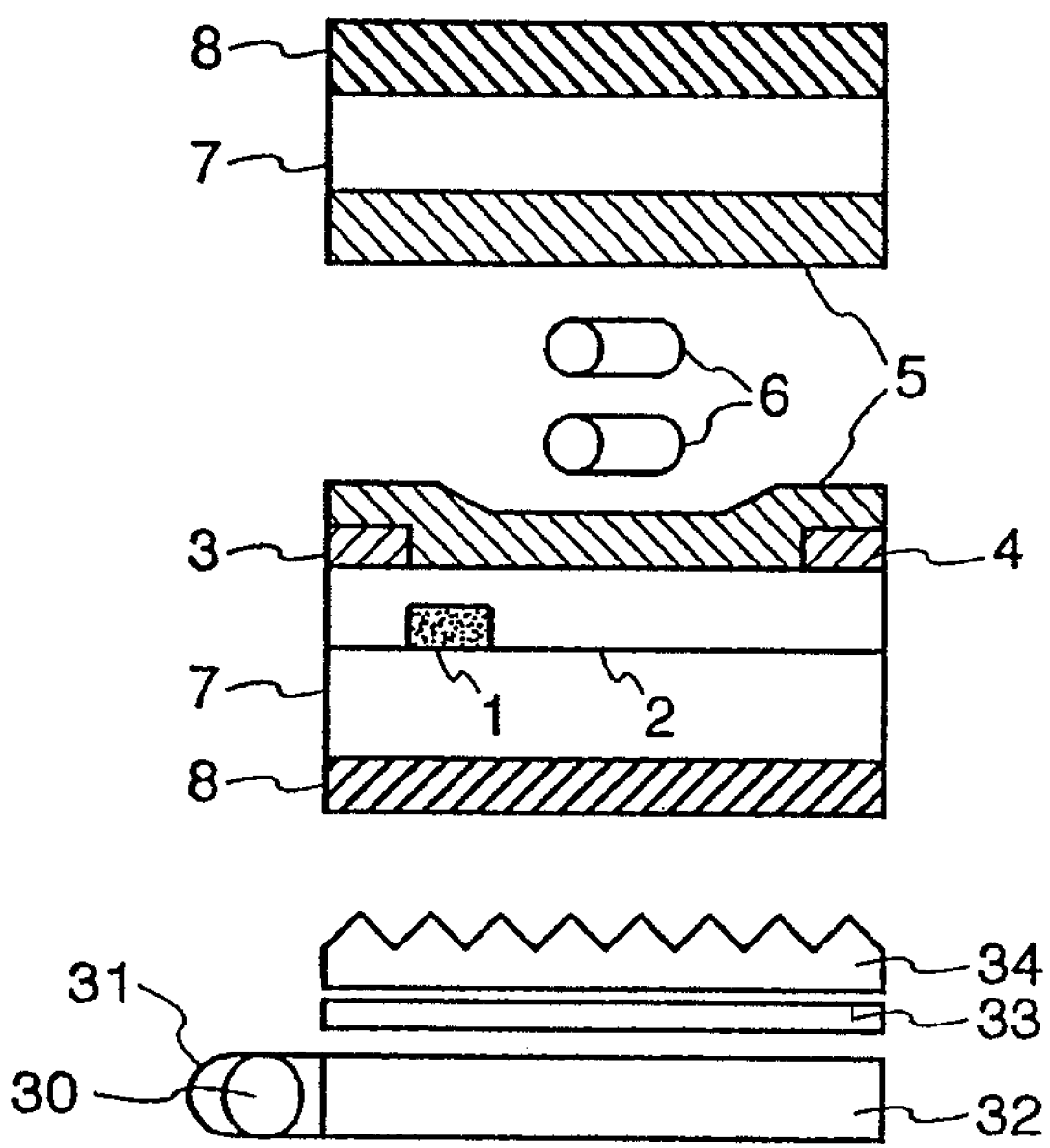
FIG. 1 is a diagrammatic view of the liquid crystal display apparatus according to the present invention.
Figure 2:
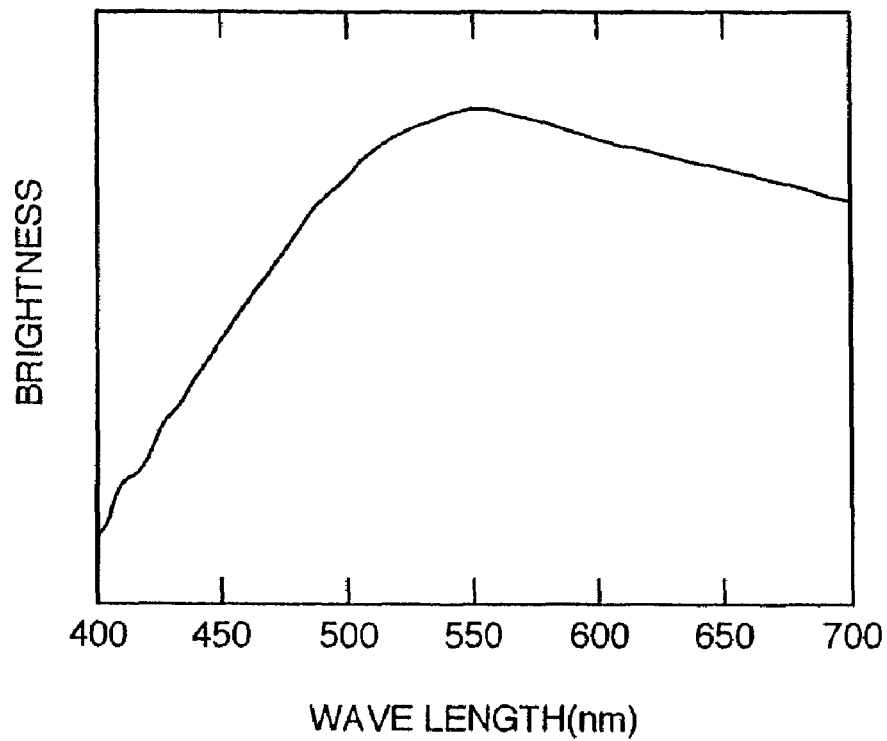
FIG. 2 is a graph which shows a characteristic of the spectral transmittance of a liquid crystal display panel of the horizontal electric field type.
Figure 7A:
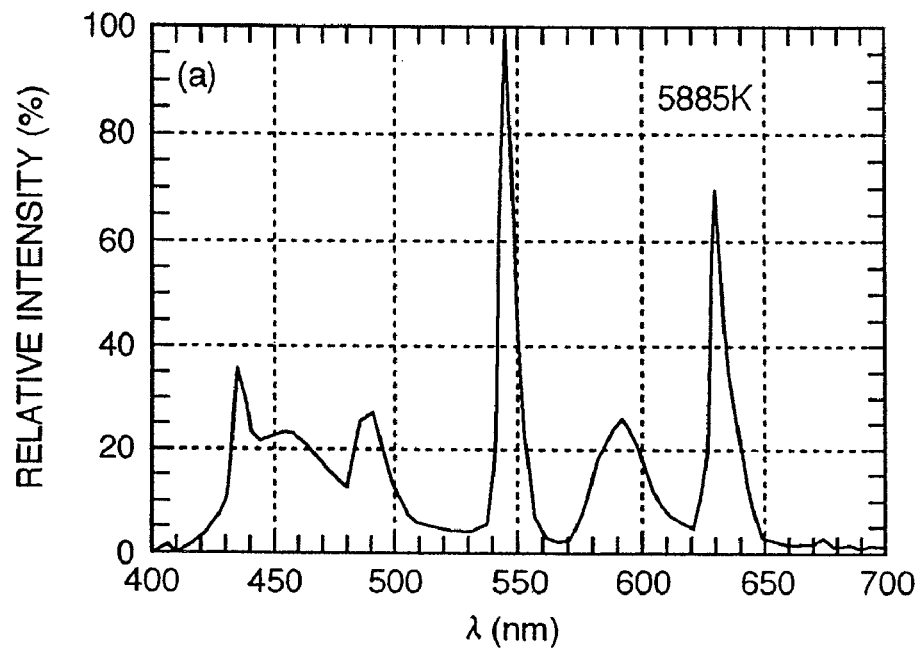
FIGS. 7(a) and 7(b) each show an shows the emission characteristic of an illuminant.

Referring now to FIG. 1, there is shown a schematic diagram of the liquid crystal display apparatus according to the present invention. The display apparatus is provided with an illuminant in the form of an edge light type back light unit having a light source 30, a wave guide 32, a diffuser 33 and a prism sheet 34. The light source 30 has a color temperature of 5885K and the luminescence spectrum shown in FIG. 7(a).

Figure 9A:
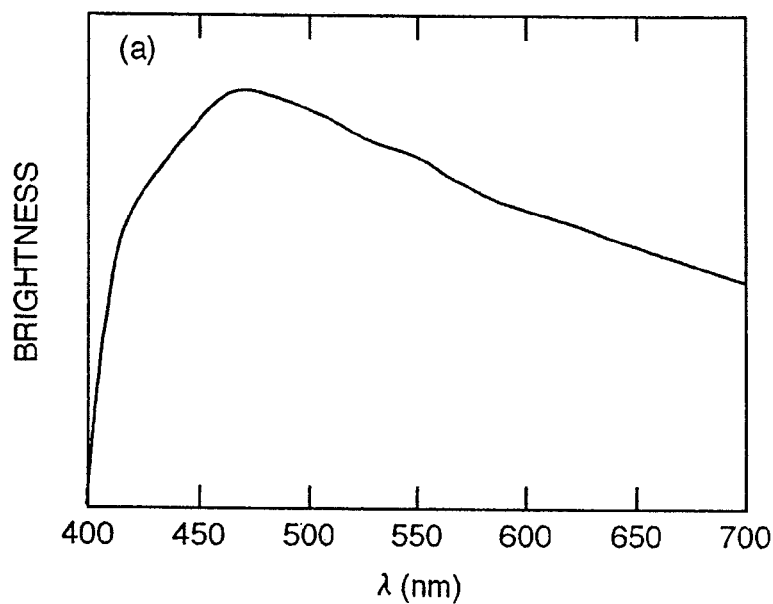
FIG. 9(a) shows the spectral transmittance of the liquid crystal display panel when a drive voltage is applied.
Figure 9B:
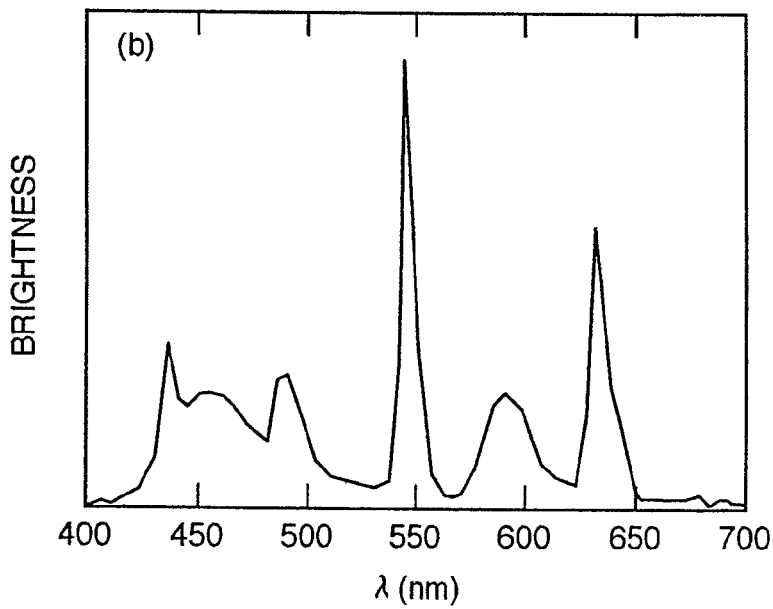
FIG. 9(b) shows a luminescence spectrum obtained by using a light source.
Figure 10:
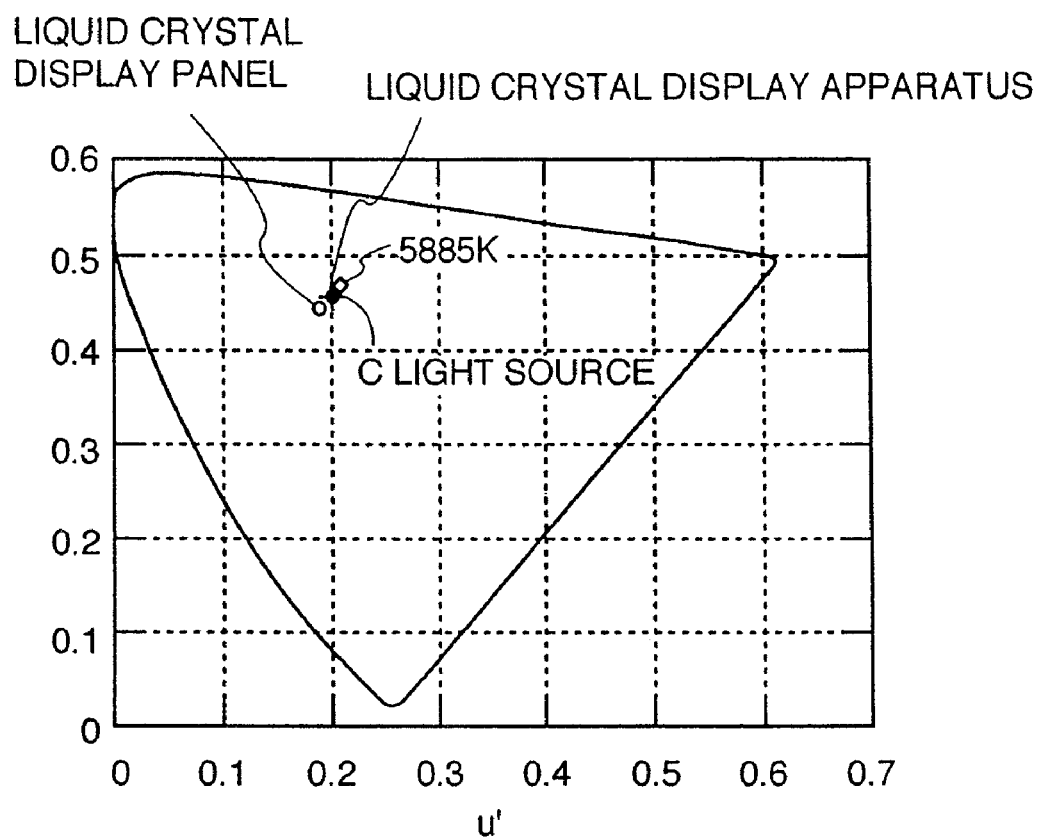
FIG. 10 is a graph which shows chromaticity coordinates concerning the above construction members.

FIG. 9(a) shows the spectral transmittance of this liquid crystal display panel when a drive voltage is applied, and FIG. 9(b) shows a luminescence spectrum obtained by using the above light source. A power of 1.8 Watts is consumed in the light source unit. Further, FIG. 10 shows the chromaticity coordinates concerning the above construction. The liquid crystal display panel uses a color of the cold color family. Fine white balance can be obtained by combining the display panel having a light source with a lower color temperature.

A nematic liquid crystal composition is inserted between the substrates, of which the anisotropy of the dielectric constant is positive, +9.0, and the anisotropy of the refractive index is 0.082 (589 nm, 20° C.). The gap d between cells equals 3.8 μm. As a result, $d_{LC} \cdot \Delta n$ equals 0.31 μm, and $d_{eff} \cdot \Delta n$ equals 0.28 μm.

Figure 8A:
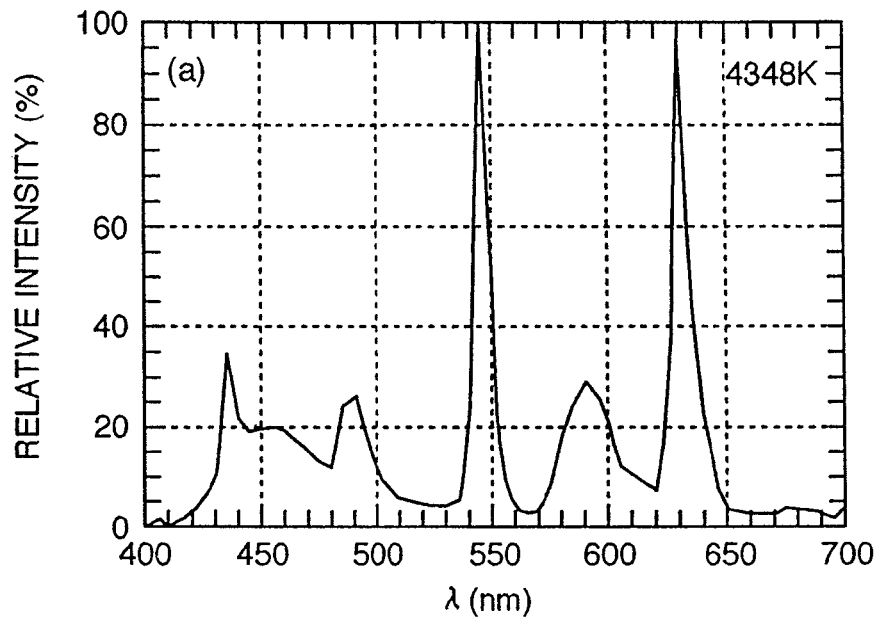
FIGS. 8(a) and 8(b) each show an the emission characteristic of an illuminant.
Figure 8B:
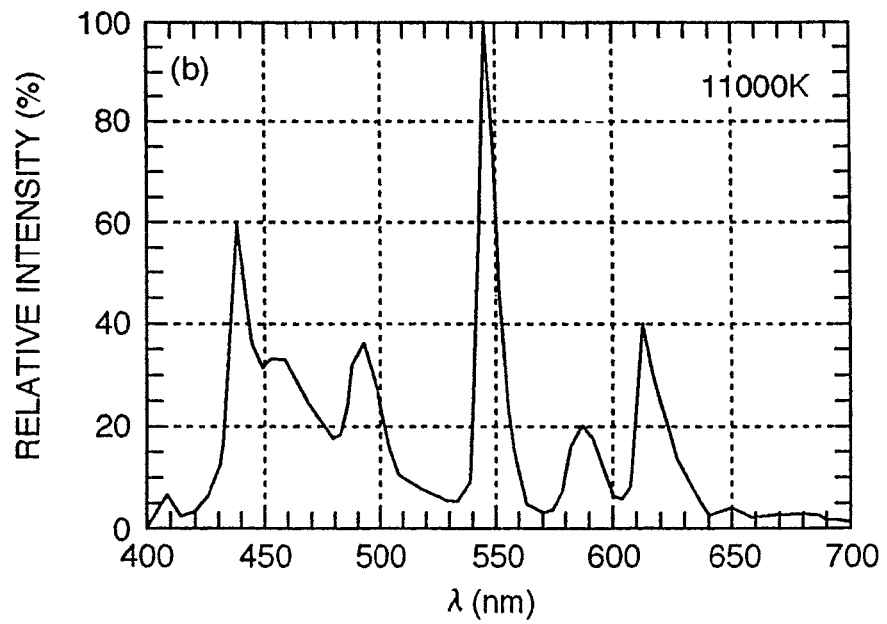

The liquid crystal display apparatus may also be provided with an edge light type back-light unit using a cold cathode fluorescent lamp as a light source having a color temperature of 11000K and the luminescence spectrum shown in FIG. 8(b).

Figure 11A:
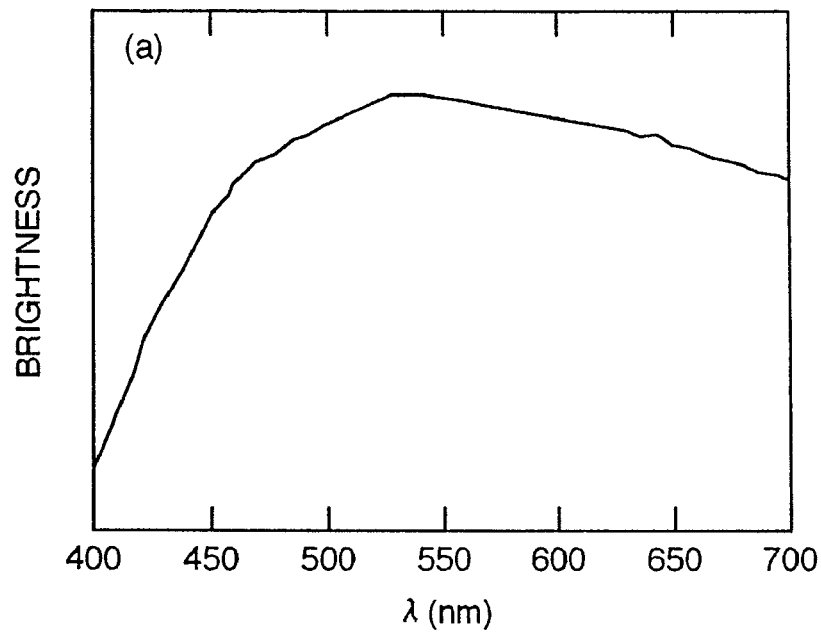
FIG. 11A shows the spectral transmittance of the liquid crystal display panel when a drive voltage is applied.
Figure 11B:
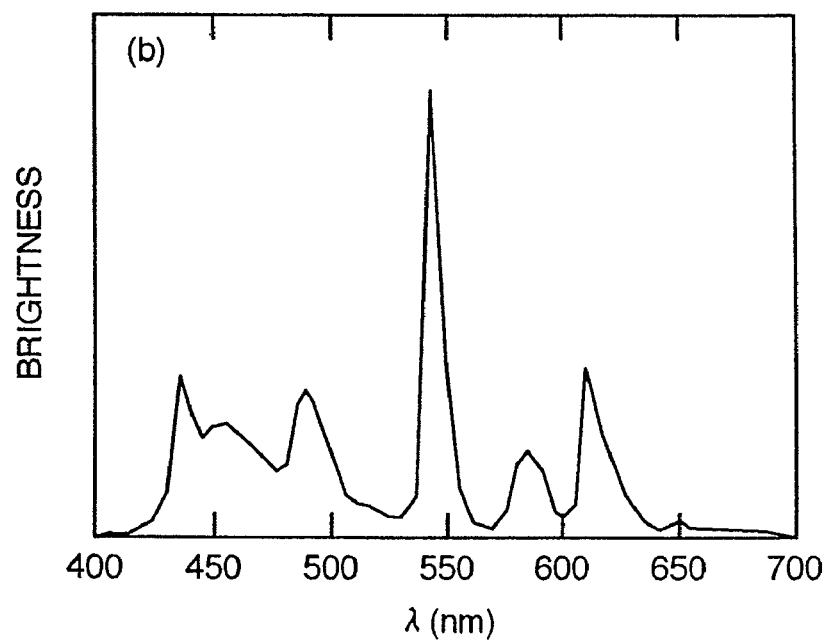
FIG. 11B shows a luminescence spectrum obtained by using a light source.
Figure 12:
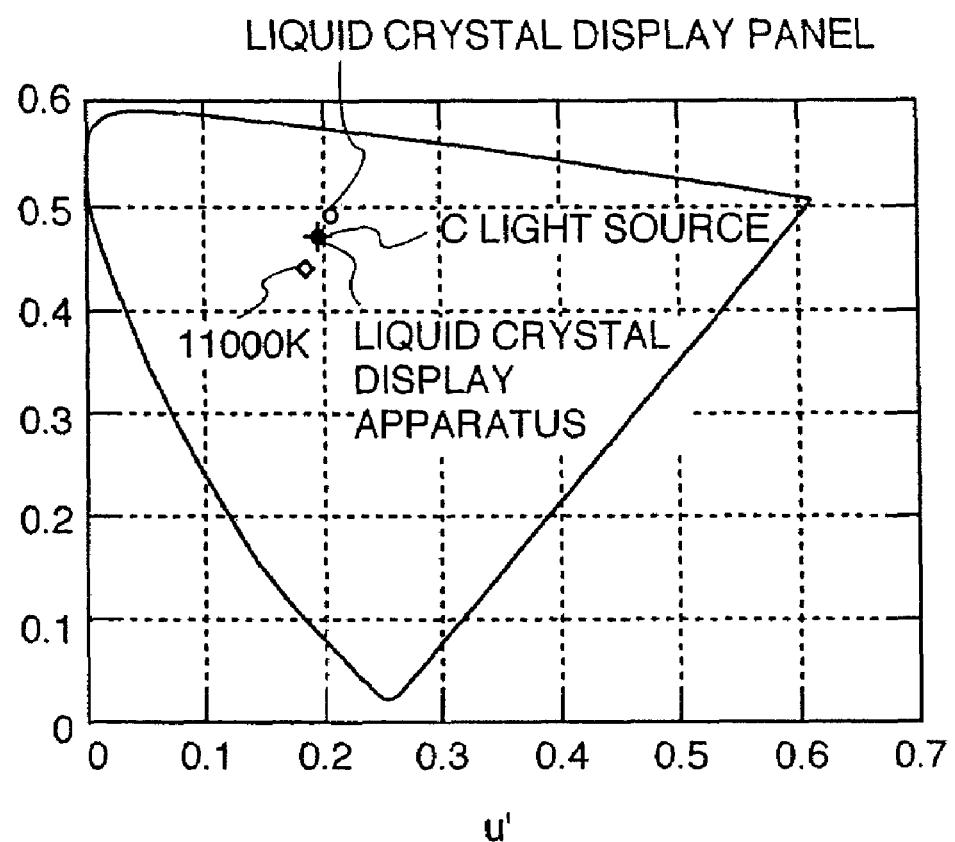
FIG. 12 is a graph which shows chromaticity coordinates of the liquid crystal display apparatus.

FIG. 11A shows the spectral transmittance of this liquid crystal display panel when a drive voltage is applied, and FIG. 11B shows a luminescence spectrum obtained by using the above light source. Further, FIG. 12 shows chromaticity coordinates concerning the above construction. In case of the combination of a yellowish liquid crystal display panel and a light source with a color of the cold color family, a power of 2 Watts is consumed in the light source unit.

Figure 13A:
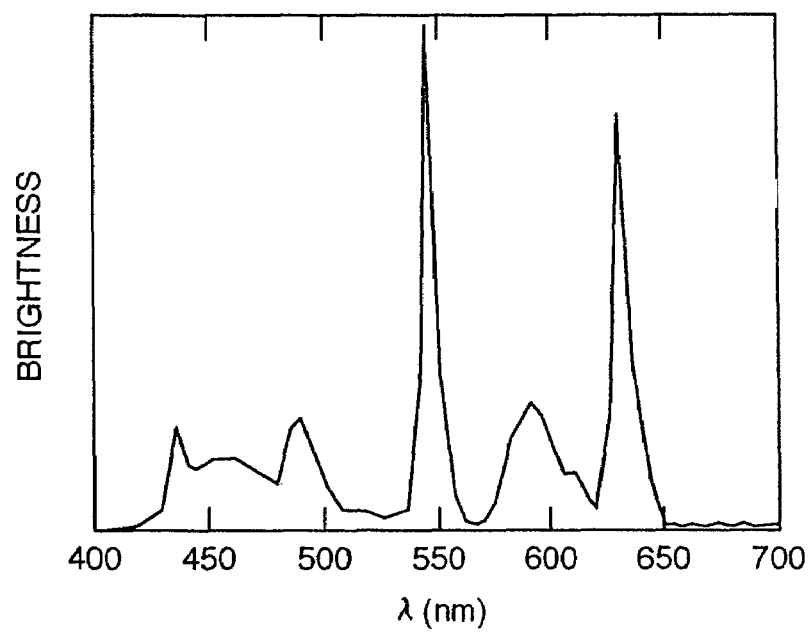
FIG. 13A shows a luminescence spectrum and FIG. 14B shows chromaticity coordinates concerning the construction members.
Figure 13B:
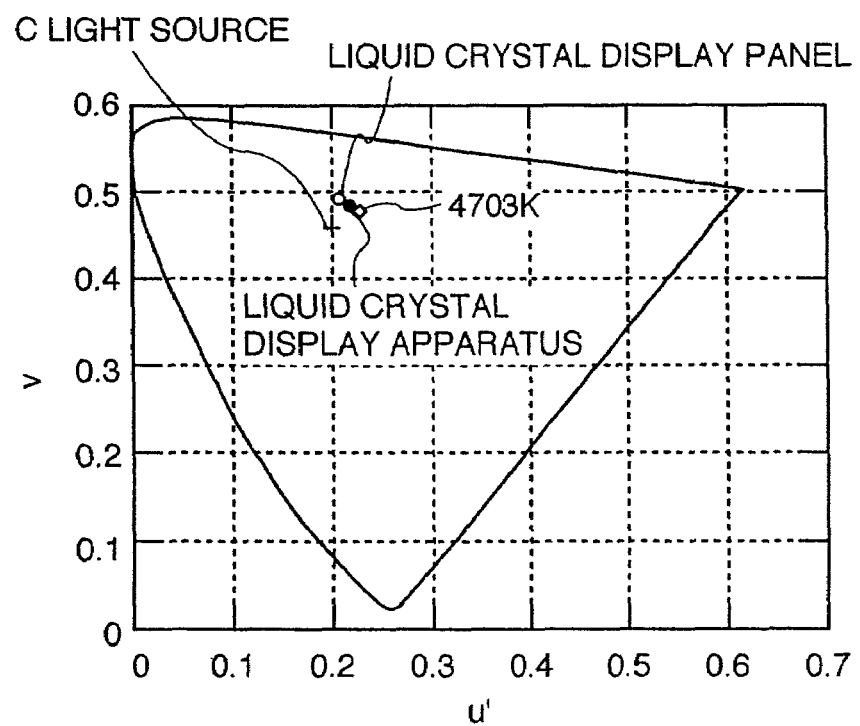

When the light source is changed to an edge light type back-light unit with a color temperature of 5885K, a power of 1.8 Watts is consumed in the light source unit. FIG. 13A shows a luminescence spectrum obtained by using this light source, and FIG. 13B shows chromaticity coordinates concerning this construction. In accordance with this example, it is possible to obtain a visually yellowish display apparatus.

Figure 6:
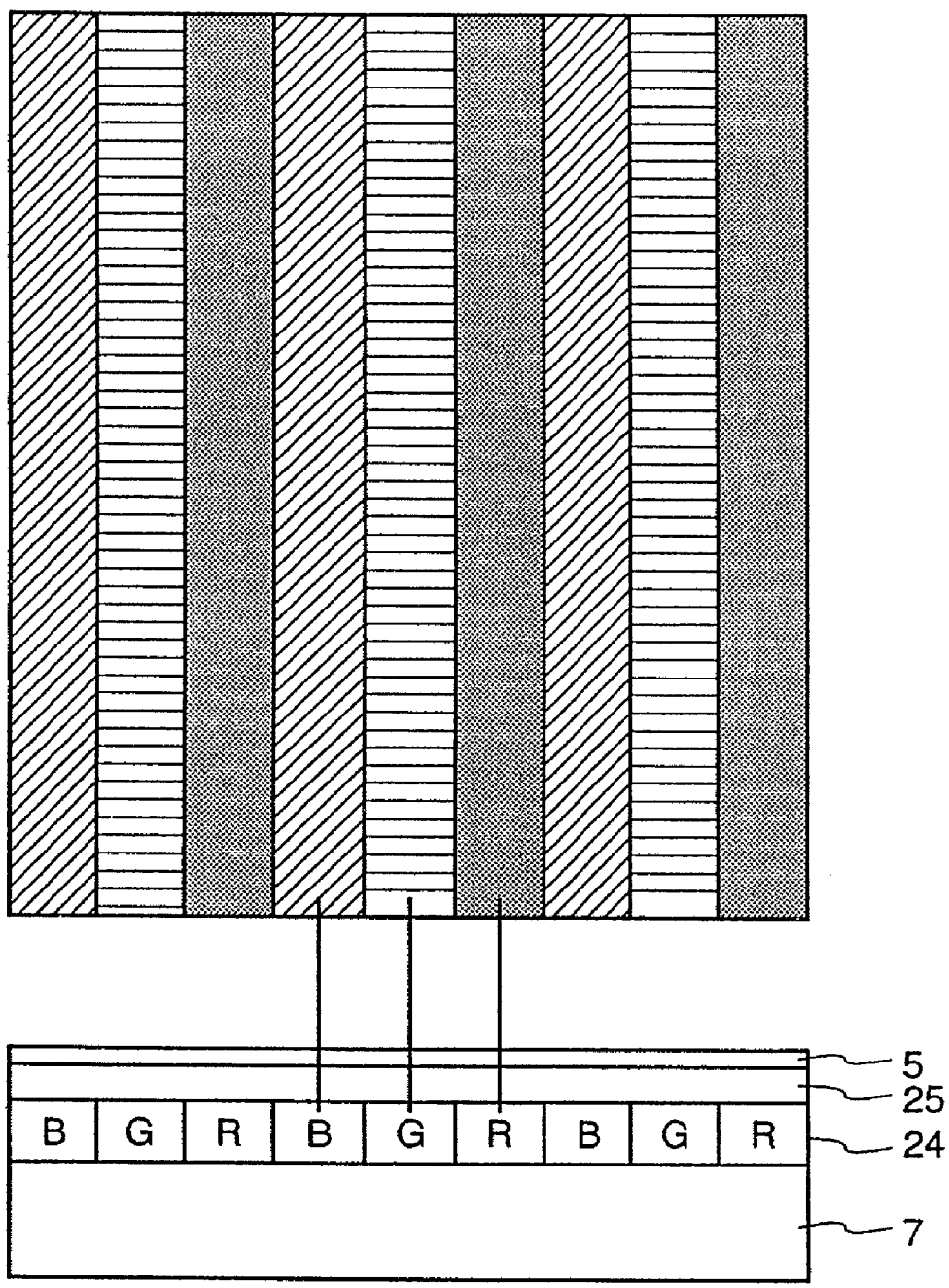
FIG. 6 is a diagram which shows the configuration of the substrate of a color filter.

A color filter 24 is provided on the substrate opposite to the substrate having transistor elements, as shown in FIG. 6.

Figure 14A:
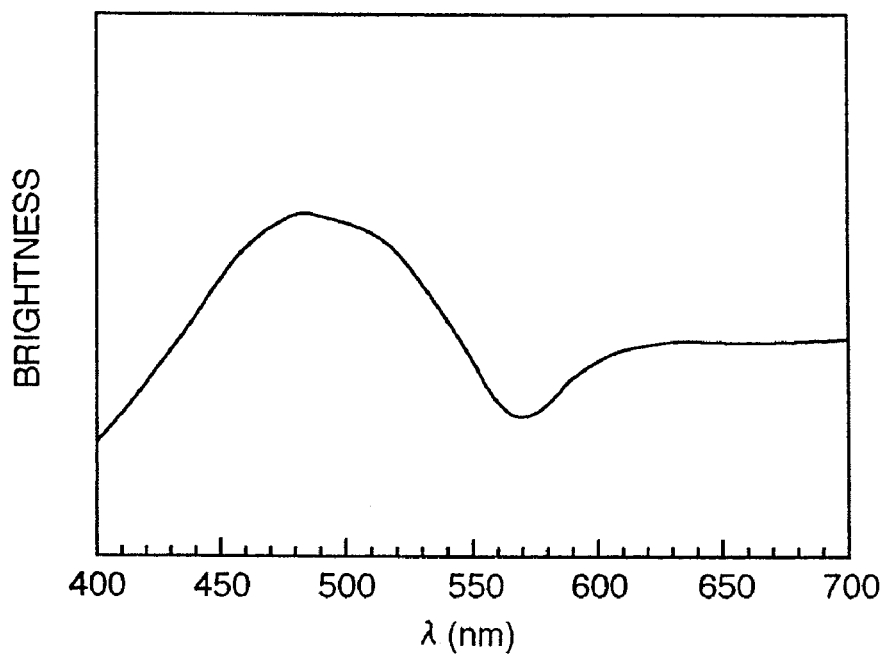
Figure 14B:
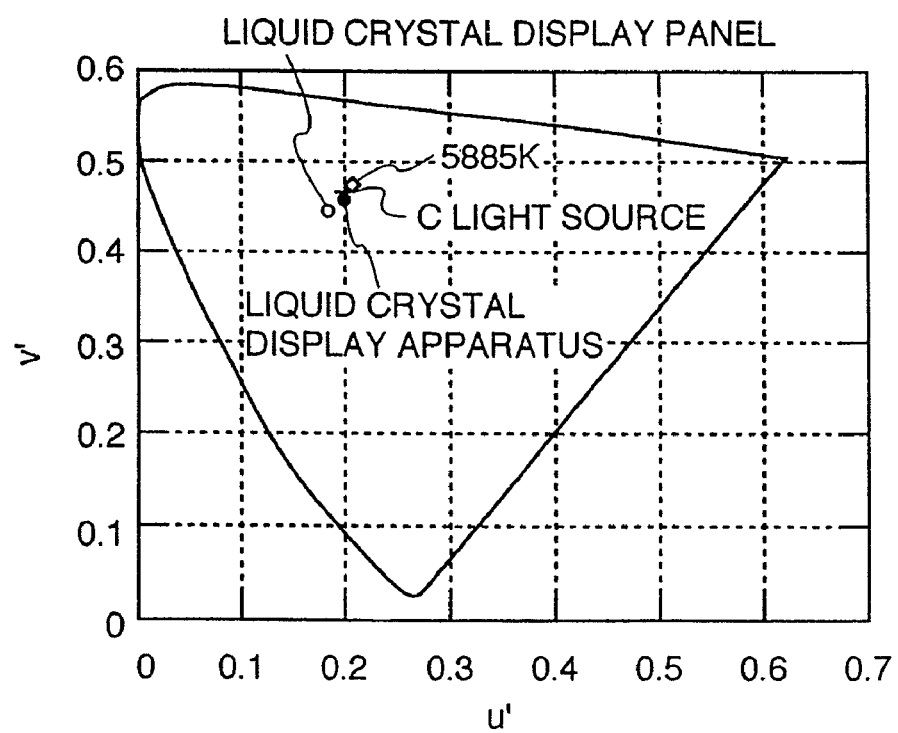

In one example, a nematic liquid crystal composition is inserted between the substrates, of which the anisotropy of the dielectric constant is positive, +7.3, and the anisotropy of the refractive index is 0.074 (589 nm, 20° C.). The gap d between cells equals 3.2 μm in such a state that spherical polymer beads are scattered and sandwiched between the substrates and the liquid crystal is sealed in. As a result, $d \cdot \Delta n$ equals 0.24 μm. FIG. 14A shows the spectral transmittance of this liquid crystal display panel when a drive voltage is applied, and FIG. 14B shows chromaticity coordinates concerning the liquid crystal display apparatus including a light source. The chromaticity coordinate under the application of a drive voltage is positioned around standard light source C. A power of 1.8 Watts is consumed in the light source unit. According to this example, it is possible to obtain a liquid crystal display apparatus of the horizontal electric field type, which is suitable for a color display.

In another example, a nematic liquid crystal composition is inserted between the substrates, of which the anisotropy of the dielectric constant is positive, +9.0, and the anisotropy of the refractive index is 0.082 (589nm, 20° C.). The gap d between cells equals 3.7 μm in such a state that spherical polymer beads are scattered and sandwiched between the substrates and the liquid crystal is sealed in. As a result, $d_{LC} \cdot \Delta n$ equals 0.30 μm, and $d_{eff} \cdot \Delta n$ equals about 0.27 μm. A phase plate is attached between the upper substrate and the polarizer, so that the angle ΦF1 of the optical axis may become parallel with the upper substrate, in other words, QF1=ΦP1=75°. The phase plate is made of poly carbonate and has a retardation of 595 nm (550 nm). The liquid crystal display panel is provided with an edge light type back-light unit using a cold cathode fluorescent lamp as a light source. The light source s has a color temperature of 4348K and the luminescence spectrum shown in FIG. 8(a).

Figure 15:
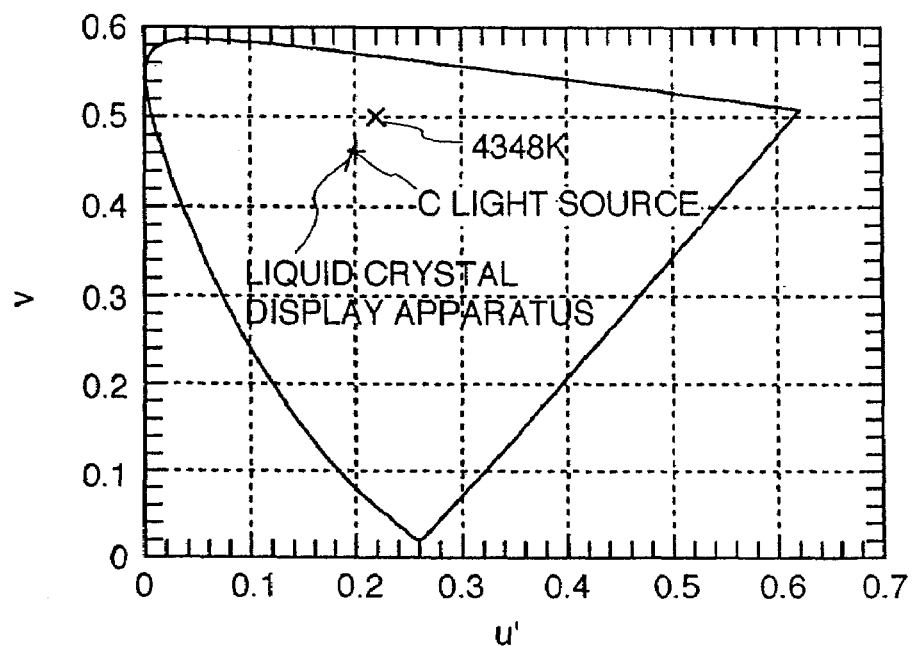
FIG. 15 shows a trail appearing on chromaticity coordinates.

FIG. 15 shows a trail appearing on the chromaticity coordinates when the voltage of the liquid crystal display apparatus is switched from ON to OFF. The trail approaches a light source C. A power of 1.7 Watts is consumed in the light source unit.

Figure 7B:
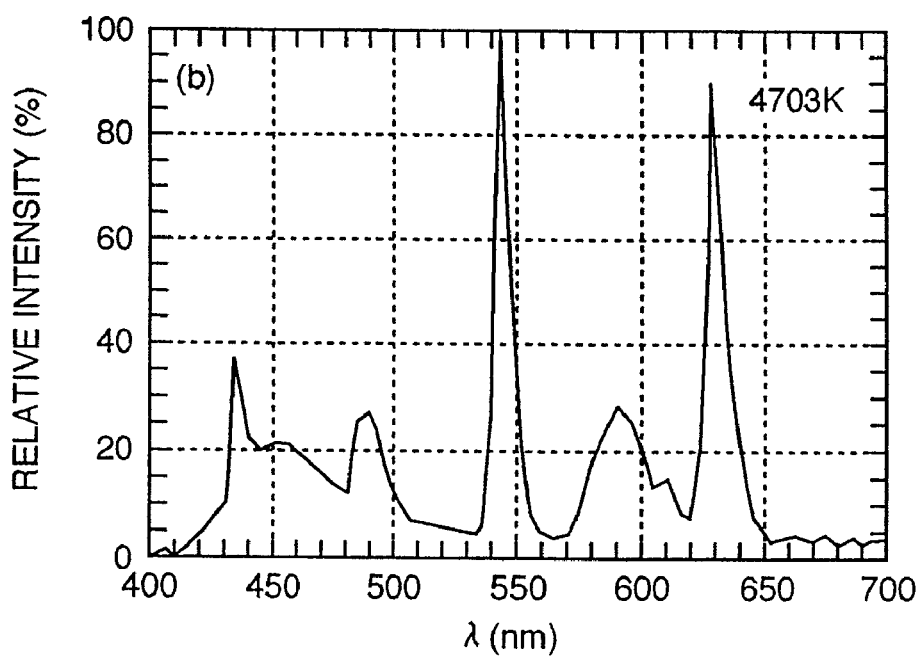

A striped color filter 24 with three colors, R, G, B, is provided on the substrate 7 opposite to the substrate having transistor elements, as shown in FIG. 6. A surface flattening protection film 25 is provided on the color filter 24, and the alignment film 5 is formed on the protection film 25. A phase plate is attached between the substrate and the polarizer, so that the angle ΦF1 of the optical axis may become orthogonal to the upper polarizer, in other words, ΦF1=ΦP2=−15°. The phase plate is made of poly carbonate and has a retardation 349 of nm (550 nm). The liquid crystal display panel is provided with an edge light type back-light unit using a cold cathode fluorescent lamp as a light source. The light source has a color temperature of 4703K and a luminescence spectrum as shown in FIG. 7(b). The chromaticity coordinates when a drive voltage of the liquid crystal display apparatus is applied is close to the light source C. A power of 1.75 Watts is consumed in the light source unit.

Figure 16:
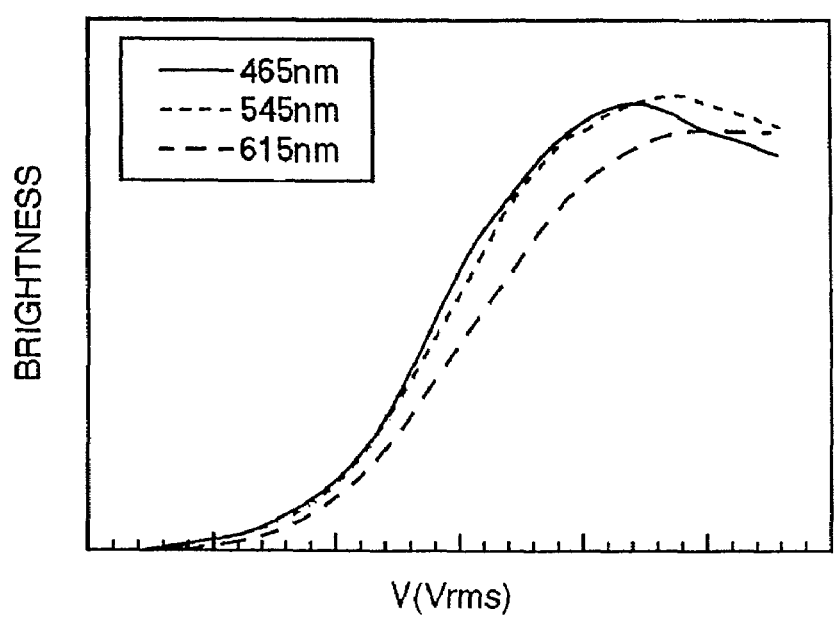
FIG. 16 shows a voltage-transmittance characteristic of the liquid crystal display apparatus.

The thickness of the film of the color filter was about 2 μm at the B and G pixels, and about 2.5 μm at the R pixels. The difference between these thicknesses remains as a level difference of about 0.3 μm after spin-coating the flat film. The level difference represents the difference of thickness between the liquid crystal layers. The edge light type back light unit, which was used for the liquid crystal display panel, included a cold cathode fluorescent lamp with a color temperature of 4703K. FIG. 16 shows a voltage-transmittance characteristic of this liquid crystal display apparatus at wavelengths of 615 nm, 545 nm and 465 nm, that is, the voltage-transmittance characteristic corresponding to each of the R, G and B pixels. It is seen from FIG. 16 that the characteristic of the transmittance of the R pixels is shifted to the high voltage side. Accordingly, when the drive voltage for the liquid crystal panel was applied, its transmittance had a characteristic in which red is suppressed. The white balance was fine when the drive voltage was applied, and an electric power of 1.75 Watts was consumed in the illuminant unit.

Figure 17:
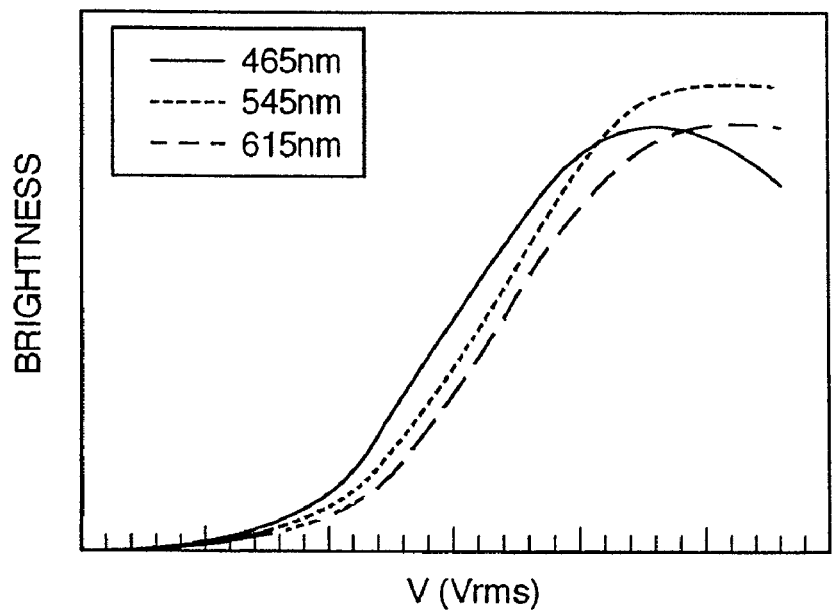
FIG. 17 shows a voltage-transmittance characteristic of the liquid crystal display apparatus.

In another example, the thickness of the film of the color filter was about 2 μm at the G and R pixels and about 1.5 μm at the B pixels. The thickness of the liquid crystal layer was about 3.8 μm at the G and R pixels, and about 4.1 μm at the B pixels. An edge light type back light unit, which was used for the liquid crystal display panel, included a cold cathode fluorescent lamp with a color temperature of 4703K. FIG. 17 shows a voltage-transmittance characteristic of this liquid crystal display apparatus at wavelengths of 615 nm, 545 nm and 465 nm, that is, a voltage-transmittance characteristic corresponding to each of the R, G and B pixels. It is seen from FIG. 17 that the characteristic of the transmittance of the B pixels is shifted to the low voltage side. Accordingly, when the drive voltage for the liquid crystal panel was applied, its transmittance had a characteristic in which blue is emphasized. The white balance was fine when the drive voltage was applied, and an electric power 1.75 Watts was consumed in the illuminant unit.

Figure 18:
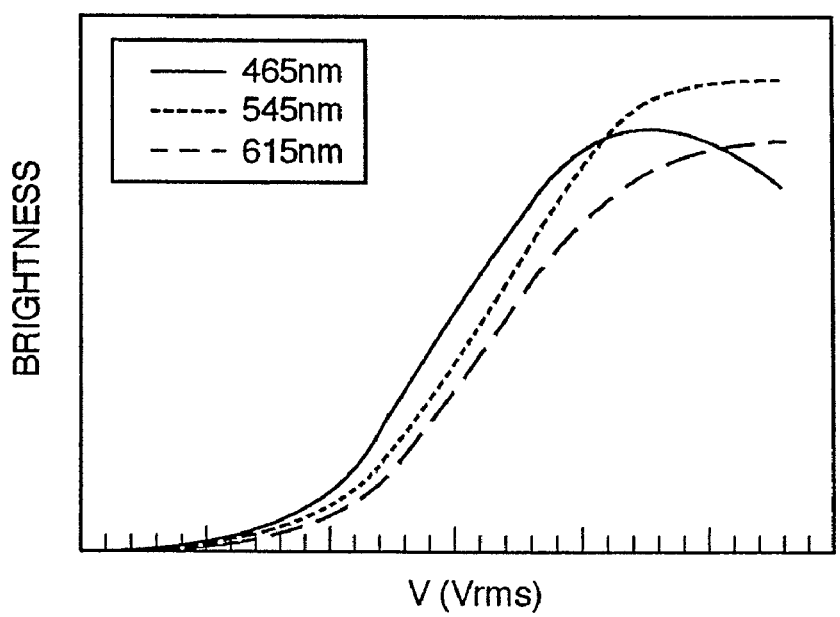
FIG. 18 shows a voltage-transmittance characteristic of the liquid crystal display apparatus.

In a further example, the thickness of the film of the color filter was about 2 μm at the G pixels, about 1.5 μm at the B pixels and about 2.5 μm at the R pixels. The thickness of the liquid crystal layer was about 4.2 μm at the G pixels, about 3.9 μm at the R pixels, and about 3.9 μm at the B pixels. An edge light type back light unit, which was used for the liquid crystal display panel, included a cold cathode fluorescent lamp with a color temperature of 4348K. FIG. 18 shows a voltage-transmittance characteristic of this liquid crystal display apparatus at wavelengths of 615 nm, 545 nm and 465 nm, that is, the voltage-transmittance characteristic corresponding to each of the R, G and B pixels. It is understood from FIG. 18 that the characteristic of the transmittance of the B pixels is shifted to the low voltage side, and the characteristic of the transmittance of the R pixels is shifted to the high voltage side. The white balance was fine when the drive voltage was applied, and an electric power 1.7 Watts was consumed in the illuminant unit.

Figure 19:
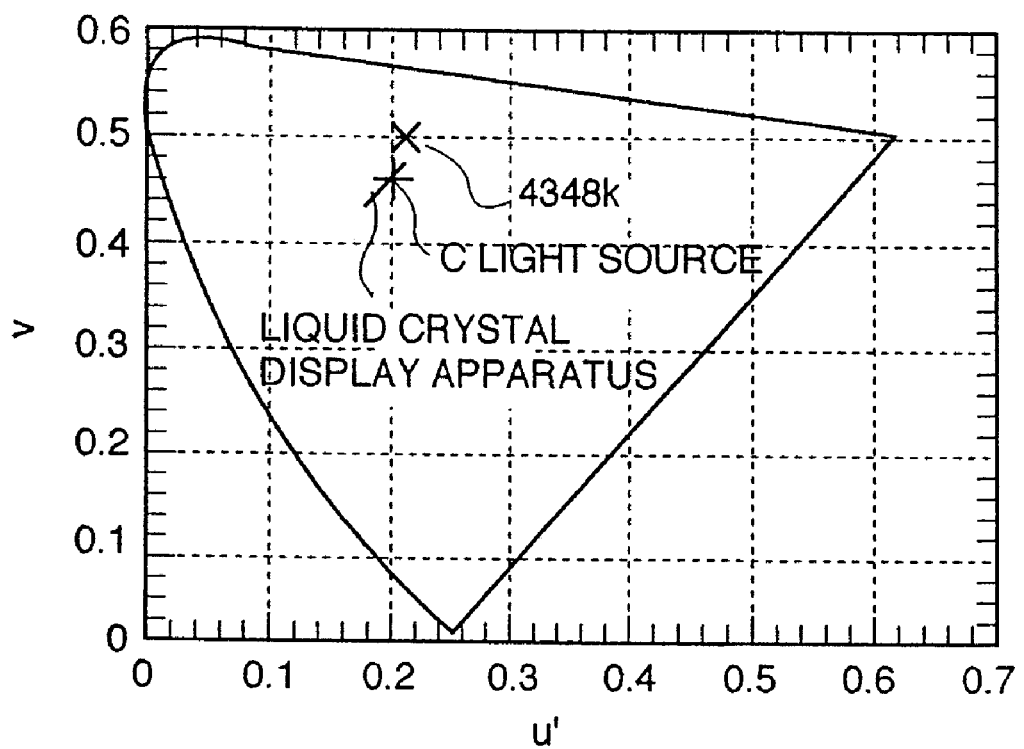
FIG. 19 shows a trail appearing on the chromaticity coordinates.

In a still further example, the thickness of the film of the color filter was about 2 μm at the G and R pixels, and about 1.5 μm at the B pixels. The thickness of the liquid crystal layer was about 4.5 μm at the G and R pixels, and about 4.2 μm at the B pixels. A phase difference film made of poly-carbonate, which has a retardation of 997 nm (550 nm), was inserted between the upper substrate and the polarizer, and it was attached so that the angle ΦF1 of its delay-phase axis was parallel with the upper polarizer, that is, ΦF1=ΦP1=75°. An edge light type back light unit, which was used for the liquid crystal display panel, included a cold cathode fluorescent lamp with a color temperature of 4348K. FIG. 19 shows a trail appearing on the chromaticity coordinates. It is seen from FIG. 19 that the trail approaches the standard illuminant C as a voltage is applied. The white balance was fine when the drive voltage was applied, and the electric power 1.70 watts was consumed in the illuminant unit.

FIGS. 20 and 21 show two different kinds of liquid crystal display panel of the horizontal electric field type. These figures each show a front view seen from a direction perpendicular to the surface of the substrate, while FIGS. 20(a) and 21(a) show side-sectional views taken along the line A-A' and FIGS. 20(b) and 21(b) show side-sectional views taken along the line B-B' in FIGS. 20 and 21, respectively. A glass substrate is not shown.

In these figures, reference numeral 14 designates a thin film transistor, which has pixel electrodes (source electrodes) 4, signal electrodes (drain electrodes) 3, a scanning electrode (gate electrode) 12, and amorphous silicon 13. A common electrode 1 and the scanning electrode 12 are formed by patterning the same metal layer formed on the glass substrate. The signal electrodes 3 and the pixel electrodes 4 are formed by patterning the same metal layer formed on a gate insulating layer 2. A load capacitance 16 is formed by allowing the insulating layer 2 to sandwich between the pixel electrodes 4 and the common electrode 1.

In FIG. 20, the pixel electrodes 4 are arranged between two common electrodes 1. An alignment control film 5 is provided directly on the gate insulating layer 2, which has also the function of a surface-flattening film. In this case, the pitch between the pixels is 69 μm in a horizontal direction and 207 μm in a vertical direction.

The width of each electrode is determined as follows. In the electrodes used as a wiring electrode bridging a plurality of pixels, that is, the scanning electrode 12, the signal electrode 3 and the wiring portion (parallel with the scanning electrode, and in a horizontal direction in FIG. 20) of the common electrode 1, the width of those electrodes are set to be, for example, 14 μm to avoid a wire defect.

The width of the pixel electrode 4 formed independently for each pixel and the longitudinally extending portion of the common electrode 1 are respectively set to be 9 μm. The common electrode 1 and the signal electrode 3 are partially superposed on each other (by 1 μm) through the insulating layer. Thereby, it becomes unnecessary to provide a black matrix in a direction parallel with the signal electrode 3. Accordingly, there is provided only a black matrix 22 which can shield the light in the direction of the scanning electrode. In addition, a color filter 24 is provided only on the surface of one substrate.

While the black matrix 22 is provided on the substrate in which the electrodes are formed, it may be possible to provide the black matrix on the opposing substrate. These electrodes can be formed in a conventional way.

In the example of FIG. 21, the common electrodes 1 and the pixel electrodes 4 are formed like a comb, in which two pixel electrodes 4 are arranged between three common electrodes 1. The pitch between the pixels is 100 μm in a horizontal scanning direction and 300 μm in a vertical direction. The insulating layer is provided on the portion where the common electrodes 1 and the signal electrodes 3 are superposed. The thickness of the insulating layer is 2 μm.

Further, a surface-flattening insulating layer 27 is provided between the alignment control film 5 and gate insulating layer 2. The material for the surface-flattening insulating layer 27 is SiO2 or SiN, the same as the gate insulating layer 2. However, it may be possible to use other suitable materials.

The width of each electrode is determined as follows.

In the electrodes used as a wiring electrode bridging between a plurality of pixels, that is, the scanning electrode 12, the signal electrode 3 and the wiring portion (parallel with the scanning electrode, and in a horizontal direction in FIG. 20) of the common electrode 1, the widths of those electrodes are set to be 10 μm, 8 μm and 8 μm, respectively, to avoid a wire defect.

The width of the pixel electrode 4 formed independently for each pixel and the longitudinally extending portion of the common electrode 1 are set to be 5 μm and 6 μm, respectively.

Because the width of the electrode is narrow in this example, the possibility of breaks is increased due to the mixing of foreign particles. In FIG. 21, a black matrix 22 is provided on the opposing substrate, along with the color filter 24, as shown in FIG. 22. Reference numeral 25 designates a protecting and surface-flattening layer. It is also possible to provide a color filter 24 on the opposed substrate or the substrate in which electrodes are formed. These electrodes can be formed in a conventional way.

Figure 23:
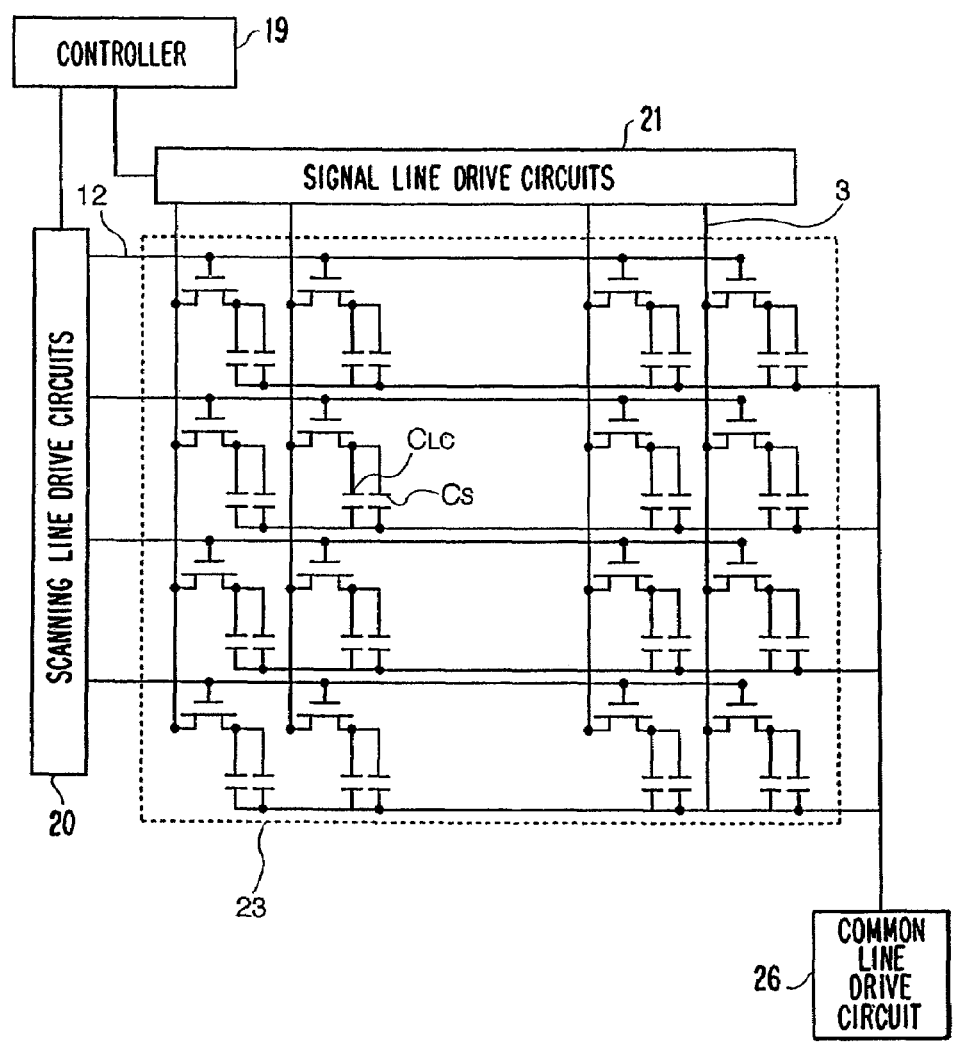
FIG. 23 is a schematic view of a driving circuit for the liquid crystal display apparatus.

FIG. 23 shows one example of a driving circuit for the liquid crystal display apparatus. In the driving circuit, a driving LSI is connected to the active matrix type liquid crystal display panel 23. Scanning line driving circuits 20, signal line driving circuits 21 and common line driving circuits 26 are provided on a TFT substrate on which a plurality of electrodes are mounted.

A scanning signal voltage, an image signal voltage and a timing signal are supplied from a power circuit (not shown) and a controller 19, and then the display operation responsive to the active matrix drive is started.

Embodiments of the present invention will be explained hereinafter.

Figure 24:
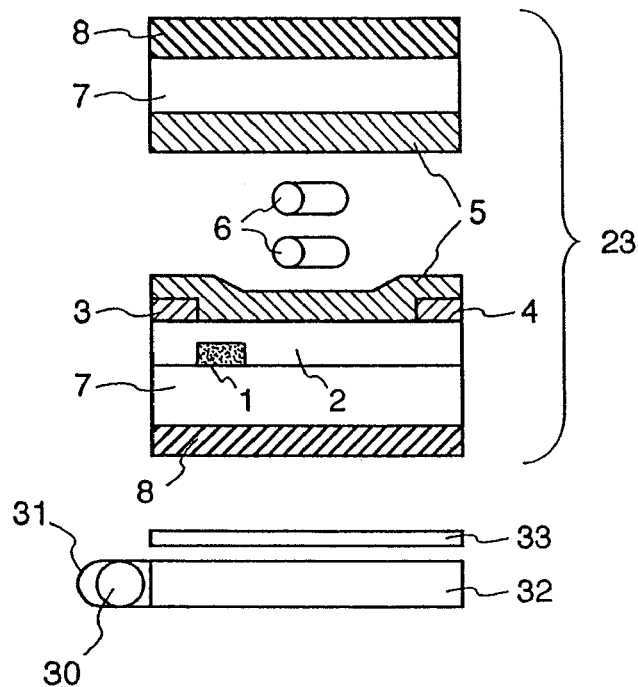
FIG. 24 is a diagrammatic view of a color filter according to an embodiment of the present invention.

In FIG. 24, reference numeral 7 designates two substrates made of glass plates having a thickness of 1.1 mm. A thin film transistor is formed on one of the substrates (lower substrate in FIG. 24), and then an insulating layer 2 and an alignment film 5 are formed on the surface thereof. In this embodiment, polyimide is used for the alignment film, and a rubbing-processing is performed to align the liquid crystal. An alignment film is also formed on the other substrate (upper substrate in FIG. 24) and then rubbing-processing is performed. The directions of the rubbing at the upper and lower substrates are in parallel with each other and at an angle of 75° with respect to the direction of the applied voltage, that is, $\Phi LC1=\Phi LC2=75°$.

A nematic liquid crystal composition is inserted between the substrates 7, of which the anisotropy of the dielectric constant is positive, +12.0, and the anisotropy of the refractive index is 0.079 (589 nm, 20° C.). The gap d between cells equals 3.02 μm due to the fact that spherical polymer beads are scattered and sandwiched between the substrates and the liquid crystal is sealed in. As a result, the thickness of the whole liquid crystal layer $d_{LC}$ becomes equal to the gap d (3.02 μm). The value of $d_{LC} \cdot \Delta n$ (589 nm) equals 0.239 μm, and from the wavelength dependence characteristic of the anisotropy of the refractive index, $d_{LC} \cdot \Delta n$ (490 nm) equals 0.244 μm. As a result, $d_{eff} \cdot \Delta n$ (490 nm) equals about 0.22 μm.

The pair of substrates 7 are sandwiched by two polarizers 8. The polarization axis of one substrate is set to satisfy $\Phi P1=75°$, and the polarization axis of the other substrate is set to satisfy $\Phi P2=-15°$. Thereby, the liquid crystal display panel 23 shown in FIG. 24 is obtained.

As shown in FIG. 24, a back-light unit, which is provided as an illuminant for transmitting light to the liquid crystal display panel 23, comprises a fluorescent lamp 30, a light cover 31, a guide 32 and a polarizer 33, and has a color temperature of 5885K.

It may be possible to from the back-light unit by using a plurality of fluorescent lamps, and preferably, to provide a prism sheet between the polarizer 33 and the lower substrate 8.

In order to obtain a display closest to the achromatic color from the characteristics of the color of the liquid crystal display panel 23 itself, except for the color filter, the color temperature of the illuminant is determined. Its color temperature is 5885K.

Figure 25:
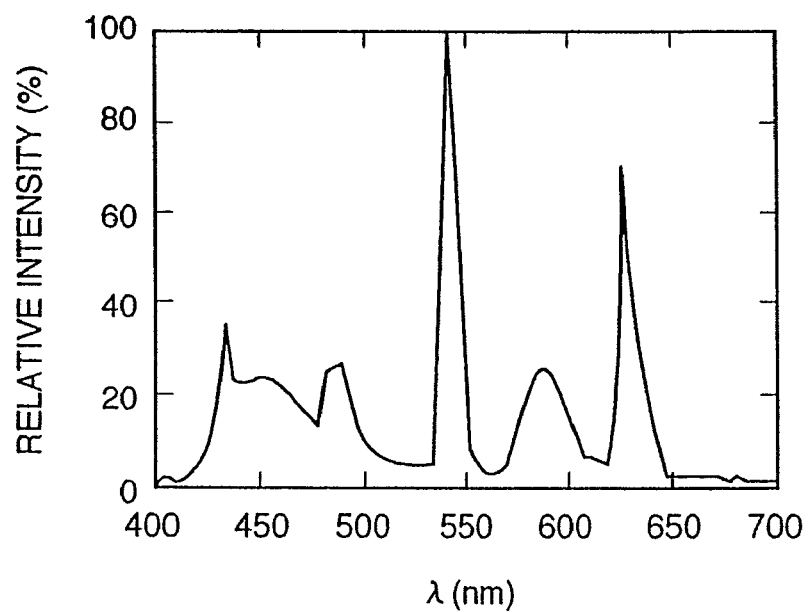
FIG. 25 shows an emission spectrum.
Figure 26:
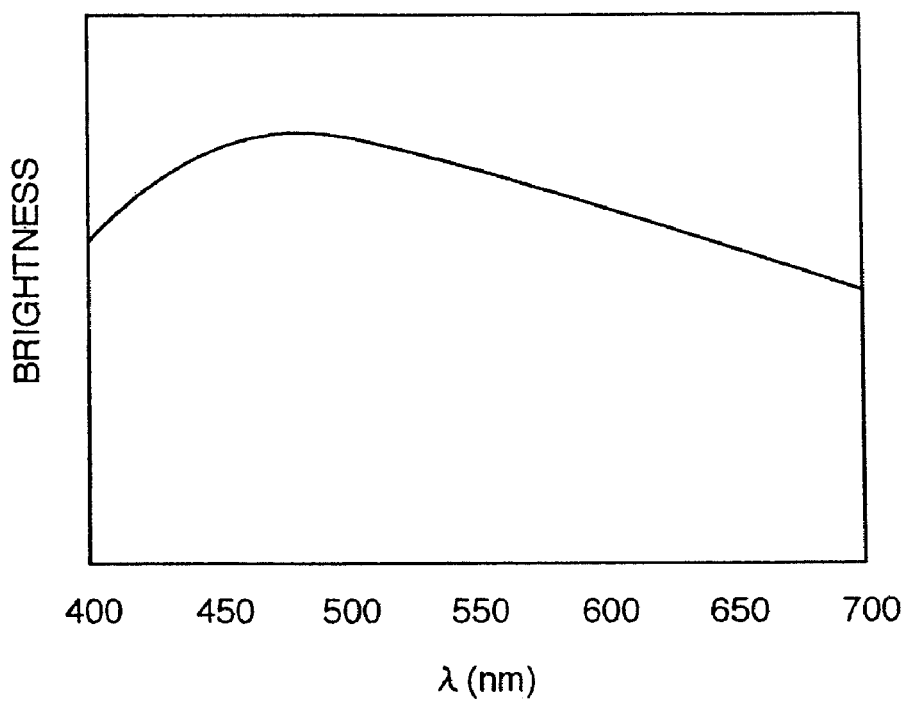
FIG. 26 shows an illustration of spectral transmittance.
Figure 27:
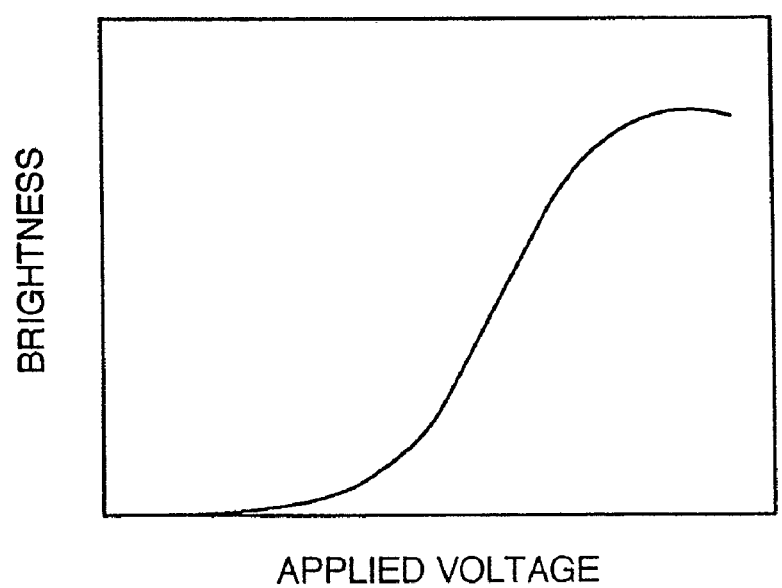
FIG. 27 shows one example of an operating characteristic of a driving circuit for the liquid crystal display apparatus.

The spectrum characteristic of the back-light is shown in FIG. 25, and the characteristic of the spectral transmittance in the light state of the liquid crystal display panel 23, except for the color filter, is shown in FIG. 26. In this embodiment, the dependence of the brightness of the liquid crystal display apparatus on an applied voltage is shown in FIG. 27.

As seen from FIG. 26, the color shift due to the intensity control is sufficiently suppressed in this embodiment.

COMPARISON EXAMPLE 1

A nematic liquid crystal composition is inserted between the substrates, of which the anisotropy of the dielectric constant is positive, +9.0, and the anisotropy of the refractive index is 0.082 (589 nm, 20° C.). The gap d, between cells equals 3.83 μm.

In this comparison example, $d_{LC} \cdot \Delta n$ (589 nm) equals 0.310 μm, and $d_{LC} \cdot \Delta n$ (490 nm) equals 0.321 μm. As a result, $d_{eff} \cdot \Delta n$ (490 nm) equals about 0.30 μm. This value is out of the present invention.

Figure 28:
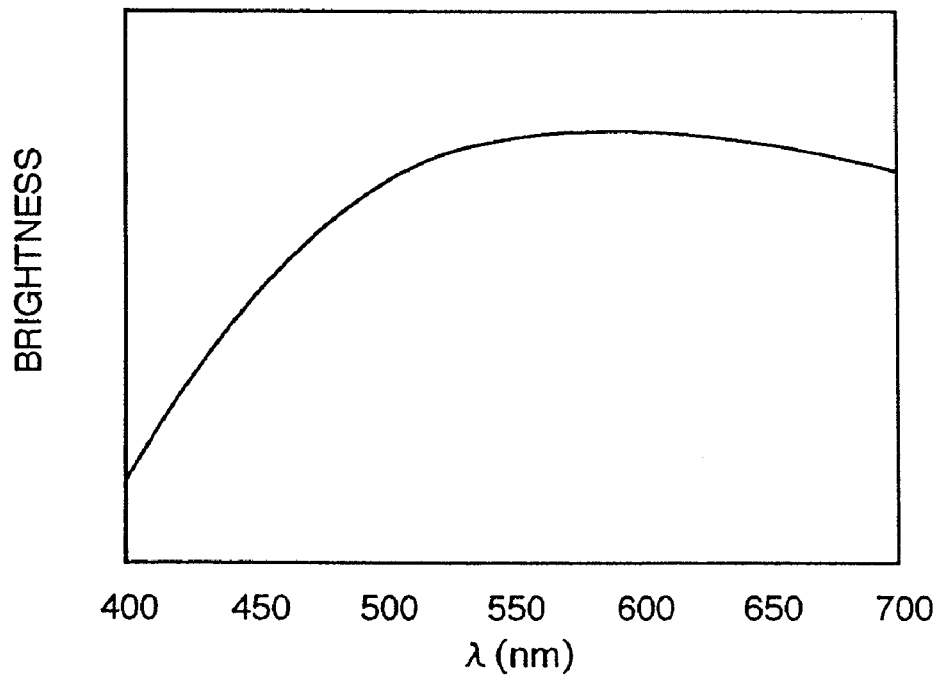
FIG. 28 shows an illustration of spectral transmittance.
Figure 29:
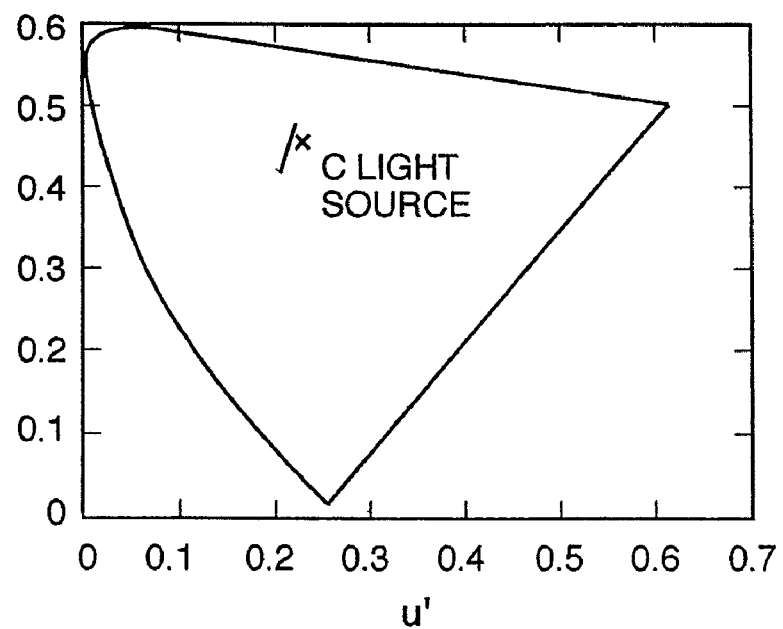
FIG. 29 shows an illustration of color shift.

This liquid crystal display panel is provided with an edge light type back-light unit using a cold cathode fluorescent lamp as a light source. The light source has a color temperature 6818K. The characteristic of the spectral transmittance in a light state of the liquid crystal display apparatus without the color filter is as shown in FIG. 28, in which the transmittance in the short wavelength region is remarkably decreased. As a result, a trail appears on the chromaticity coordinates until a voltage of the liquid crystal display apparatus is switched from OFF (a dark state) to ON (a light state), as shown in FIG. 29, in which the color is shifted and the liquid crystal display panel itself is colored.

As seen from the comparison example 1, the color is shifted as the dark state is shifted into the light state in the liquid crystal display apparatus using the liquid crystal display panel in which the transmittance at the short wavelength is reduced. According to this comparison example, it is difficult to suppress the color shift in the color display and the coloring in the black and white display, and thus the quality of the displayed image essentially deteriorates.

COMPARISON EXAMPLE 2

In the comparison example 2, a nematic liquid crystal composition is inserted between the substrates, of which the anisotropy of the dielectric constant is positive, +9.0, and the anisotropy of the refractive index is 0.082 (589 nm, 20° C.). The gap d between cells equals 4.26 µm.

In this comparison example, $d_{LC} \cdot \Delta n$ (589 nm) equals 0.345 µm, and $d_{LC} \cdot \Delta n$ (490 nm) equals 0.357 µm. As a result, $d_{eff} \cdot \Delta n$ (490 nm) becomes equal to about 0.33 µm. This value is also outside of the present invention. It is understood that the transmittance for blue light is reduced.

Figure 30:
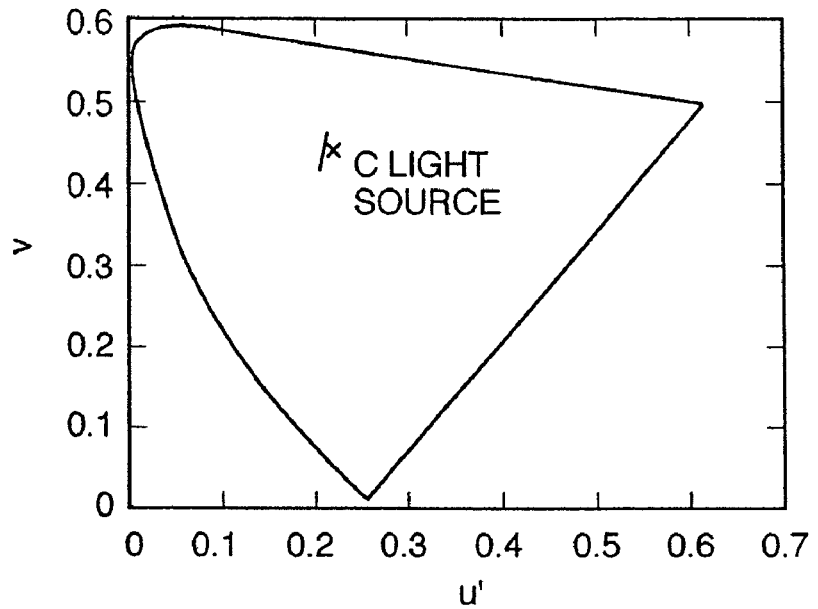
FIG. 30 shows an illustration of color shift.

This liquid crystal display panel is provided with an edge light type back-light unit using a cold cathode fluorescent lamp as a light source. The light source has a color temperature 6818K. A trail appears on the chromaticity coordinates until a voltage of the liquid crystal display apparatus is switched from OFF (a dark state) to ON (a light state) as shown in FIG. 30. As seen from the comparison example 2, the color is shifted to a yellowish color, as the dark state is shifted into the light state. Also, according to this comparison example, it is difficult to improve the quality of the displayed image.

The change in the characteristics caused by the local change in the thickness of the liquid crystal will be explained with reference to various embodiments and comparison examples.

Embodiment A

The liquid crystal display apparatus has two substrates, one of which has a color filter with B, G and R pixels on its surface. A nemnatic liquid crystal composition is inserted between the substrates, of which the anisotropy of the dielectric constant is positive, +12.0, and the anistropy of the refractive index is 0.079 (589 nm, 20° C.). The gap d between cells is formed by scattering spherical polymer beads and sandwiching them between the substrates. The gap is adjusted to d=2.87 µm by selecting the radius of the beads.

In this comparison example, $d_{LC} \cdot \Delta n$ (589 nm) equals 0.227 µm and $d_{LC} \cdot \Delta n$ (490 nm) equals 0.232 µm. As a result, $d_{eff} \cdot \Delta n$ (490 nm) equals about 0.21 µm. This value is out of the present invention.

The liquid crystal display panel is provided with a backlight unit as a light source which has a color temperature of 6818K.

Embodiment B

The liquid crystal display apparatus has two substrates, one of which has a color filter with B, G and R pixels on its surface. A nematic liquid crystal composition is inserted between the substrates, of which the anisotropy of the dielectric constant is positive, +12.0, and the anisotropy of the refractive index is 0.079 (589 nm, 20° C.). The gap d between cells is formed by scattering spherical polymer beads and sandwiching them between the substrates. The gap is adjusted to d=3.17 µm by selecting a radius of the beads which is different from that in embodiment A.

In this embodiment B, $d_{LC} \cdot \Delta n$ (589 nm) equals 0.250 µm and $d_{LC} \cdot \Delta n$ (490 nm) equals 0.256 µm. As a result, $d_{eff} \Delta n$ (490 nm) equals about 0.23 µm.

The liquid crystal display panel is provided with a backlight unit as a light source which has a color temperature of 4703K.

COMPARISON EXAMPLE C

The liquid crystal display apparatus has two substrates, one of which has a color filter with B, G and R pixels on its surface. A nematic liquid crystal composition is inserted between the substrates, of which the anisotropy of the dielectric constant is positive, +9.0, and the anisotropy of the refractive index is 0.082 (589 nm, 20° C.). The gap d, between cells is adjusted to d=3.83 µm.

In this comparison example, $d_{LC} \cdot \Delta n$ (589 nm) equals 0.314 µm, and $d_{LC} \cdot \Delta n$ (490 nm) equals 0.321 µm. As a result, $d_{eff} \cdot \Delta n$ (490 nm) equals about 0.30 µm. This value is out of the present invention.

The liquid crystal display panel is provided with a backlight unit as a light source which has a color temperature of 6818K.

COMPARISON EXAMPLE D

The liquid crystal display apparatus has two substrates, one of which has a color filter with B, G and R pixels on its surface. A nematic liquid crystal composition is inserted between the substrates, of which the anisotropy of the dielectric constant is positive, +9.0, and the anisotropy of the refractive index is 0.082 (589 nm, 20° C.). The gap d between cells is adjusted to d=4.26 µm.

In this comparison example, $d_{LC} \cdot \Delta n$ (589 nm) equals 0.349 µm, and $d_{LC} \cdot \Delta n$ (490 nm) equals 0.357 µm. As a result, $d_{eff} \cdot \Delta n$ (490 nm) equals about 0.33 µm. This value is also out of the present invention.

The liquid crystal display panel in the comparison example D is provided with a back-light unit as a light source which has a color temperature of 6818K.

As should be clearly understand from the above description, there is a difference of 10% in the gap between the embodiments A and B, and between the comparison examples C and D. Accordingly, it is possible to estimate the color shift caused by the change in the thickness $d_{eff}$ (□d) of the liquid crystal layer, that is, the gap margin.

Figure 31:
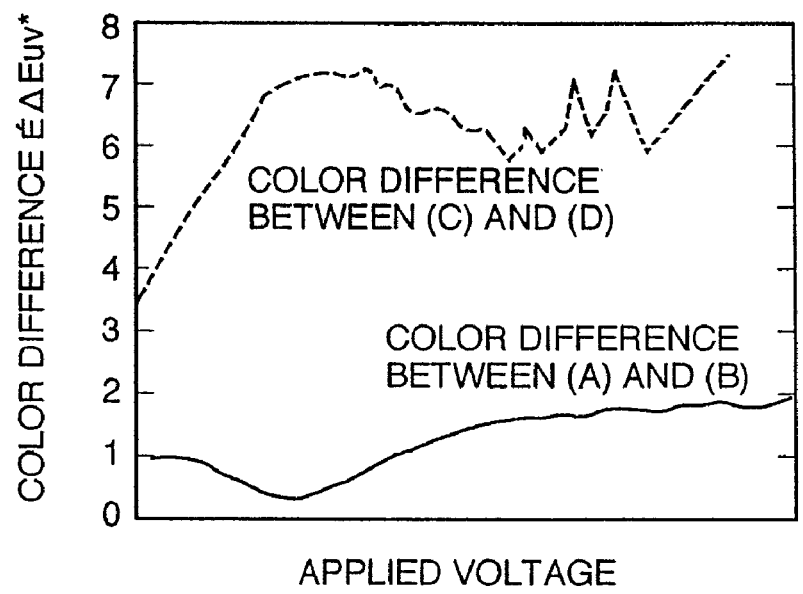
FIG. 31 shows one example of an operating characteristic of a driving circuit for the liquid crystal display apparatus.

FIG. 31 shows the characteristic of the color difference ΔEuv* in relation to the applied voltage in the embodiments A and B, and the comparison examples C and D. The characteristic of the color difference can be obtained by using the color difference equation of the main color family concerning L*u*v* proposed by CIE in 1976.

In general, the value of the color difference ΔEuv* allowable in the same liquid crystal display panel is around 3 in such a liquid crystal display apparatus.

Referring now to FIG. 31, as clearly understood from the characteristic shown by the solid line of this figure, even if there is a difference of 10% in the gap between the embodiments A and B in the same display panel, the value of the color difference ΔEuv* is held to less than 2. Accordingly, a color defect is not evident in this case.

While, as clearly understood from the characteristic shown by the dotted line of FIG. 31, if there is a difference of 10% in the gap between the comparison examples C and D in the same display panel, a large color difference ΔEuv* appears in response to the applied voltage. Therefore, a remarkable color defect may be expected in this case.

In the embodiments of the present invention, it is understood that even if there is a difference of 10% in the gap between the embodiments A and B in the same display panel, a color defect is not evident in this case, and it is possible to obtain a sufficient margin for the change in the gap.

The reason for the occurrence of a color difference in the embodiments of the present invention and the comparison examples will be explained from the view point of the difference in the passing characteristic for the colors, R, G and B.

Figure 32:
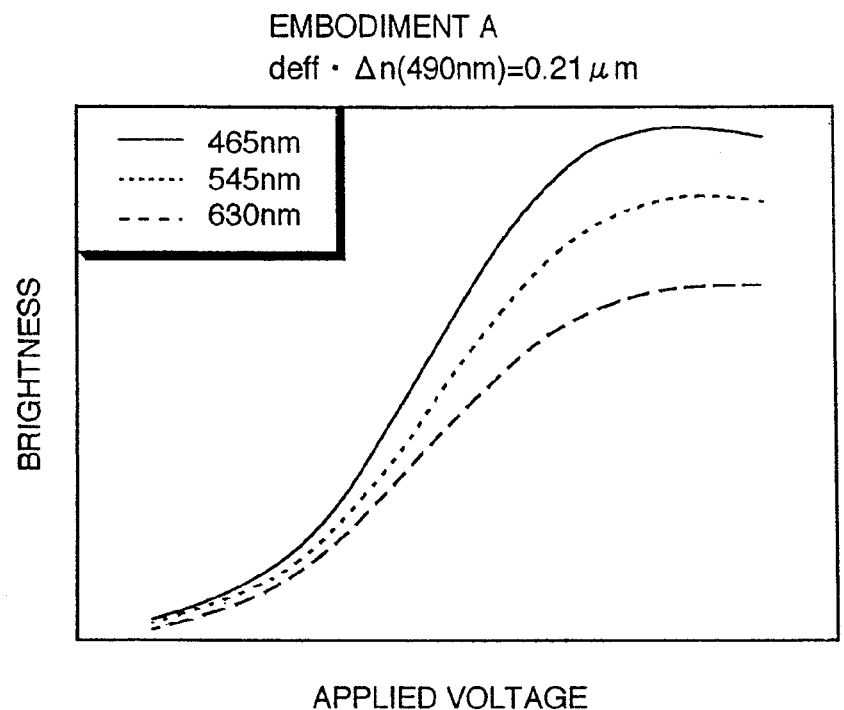
FIGS. 32 and 33 show the characteristics of the brightness to the applied voltage in embodiments A and B by setting each of R, G and B as parameters.
Figure 33:
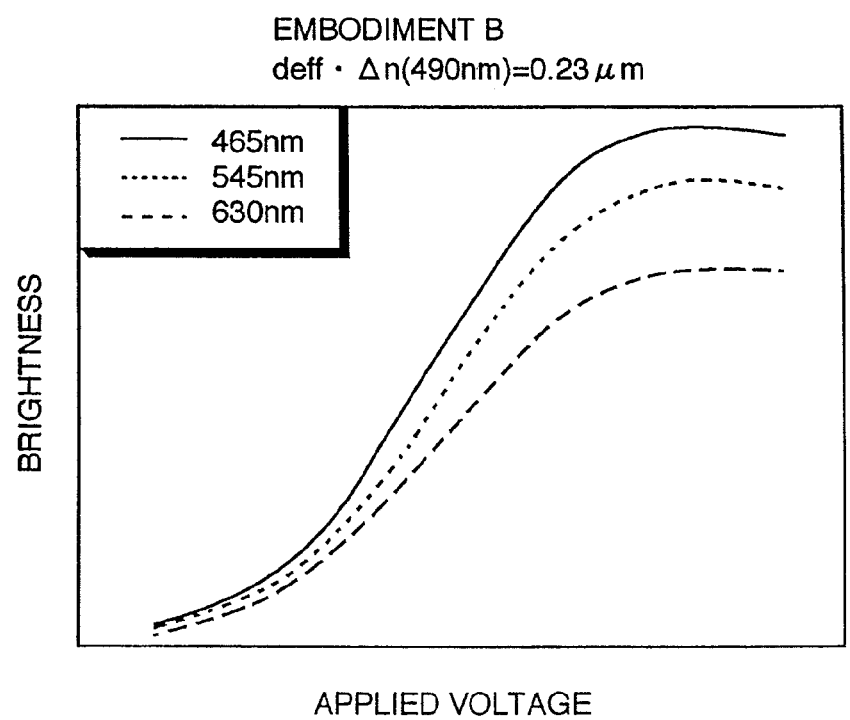
Figure 34:
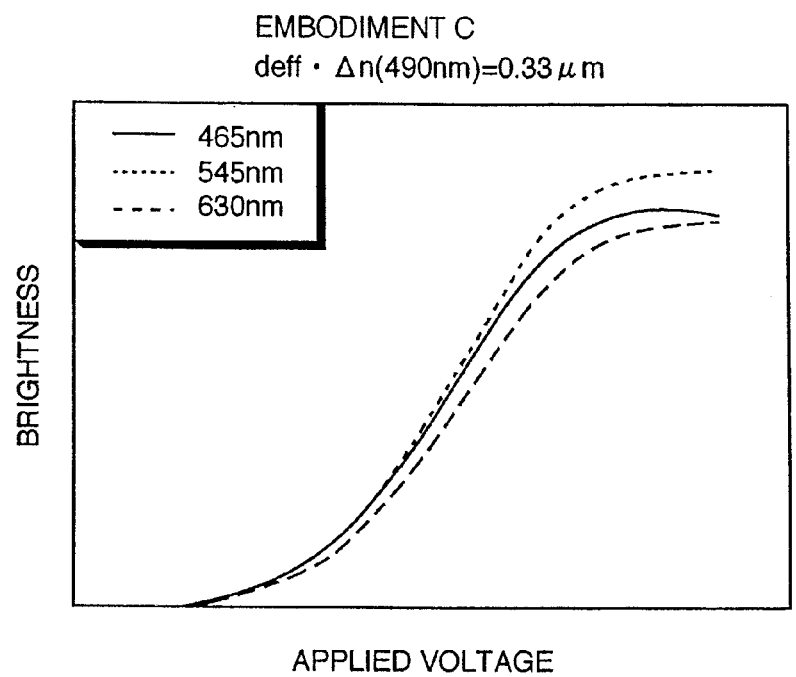
FIGS. 34 and 35 show characteristics similar to those of FIGS. 31 and 32 with regard to comparison examples C and D.
Figure 35:
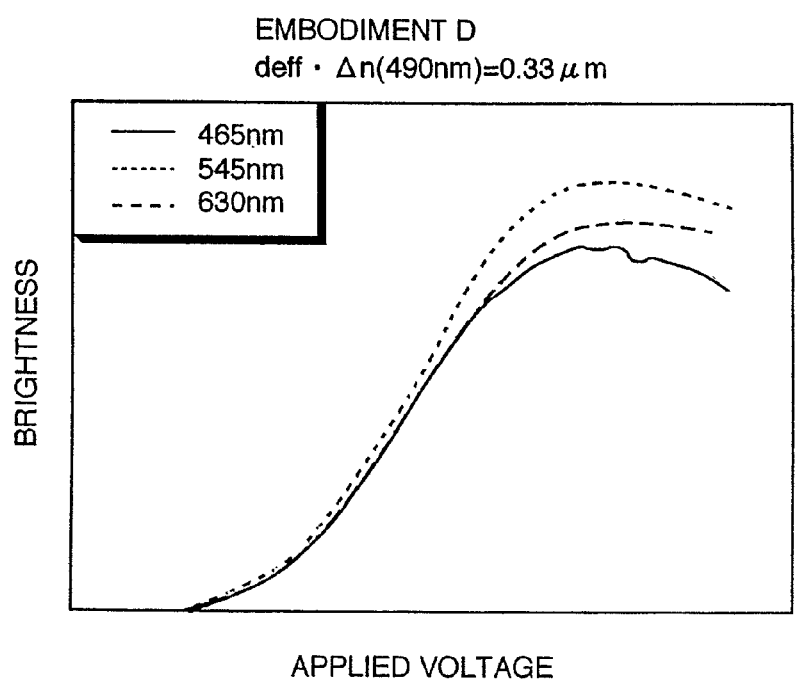

FIGS. 32 and 33 show the characteristics of the brightness in relation to the applied voltage in the embodiment A and B by setting each of the colors R, G and B as parameters. Further, FIGS. 34 and 35 show characteristics similar to FIGS. 31 and 32 with regard to the comparison examples C and D, where the value of the wavelength of each color was measured by using the back-light with the luminescence characteristics shown in FIG. 25. The value of the wavelength of B (blue) was set to the middle value, 465 nm, of the spectra in a blue portion.

The following fact is clarified from these figures.

In the embodiments of the present invention shown in FIGS. 32 and 33, the tendency of the change in the characteristic of each color is the same until the display is switched from a dark state to a light state, and the contribution of a color to the brightness is almost equal in each color. Accordingly, the color shift is not evident in these embodiments. In the comparison examples, the tendency (shown by a solid line) of the change in the characteristic of blue is different from those of red and green. As the applied voltage increases, the contribution of blue to the brightness decreases. Accordingly, in these examples, as the brightness increases, the component of blue is reduced. As a result, a yellowish display appears, and thus the color is shifted.

Figure 36:
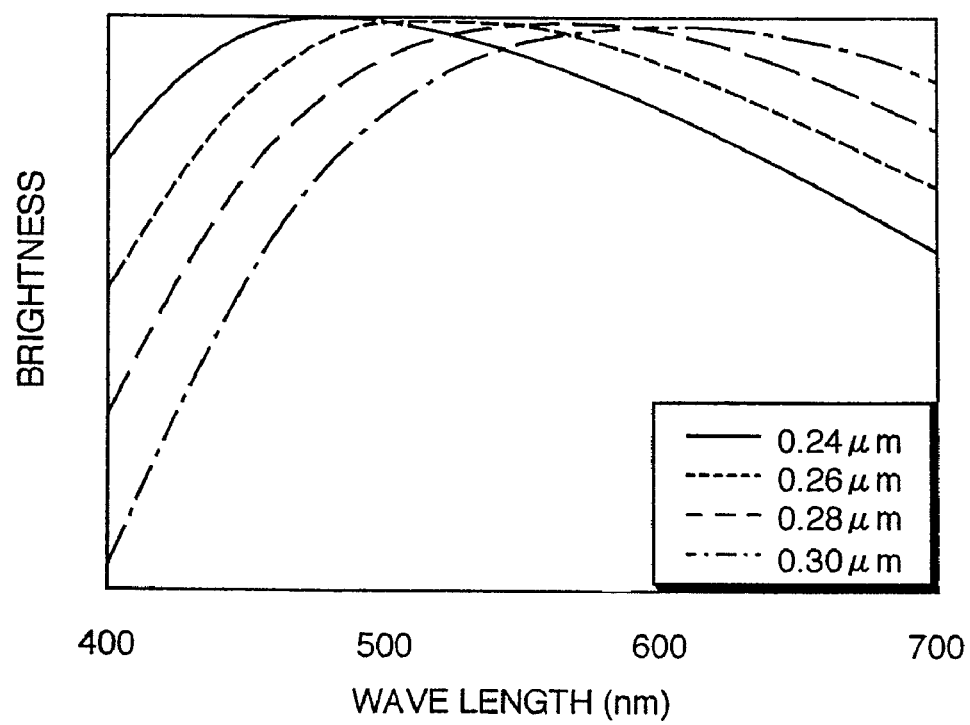
FIG. 36 shows a characteristic of transmittance.

In FIG. 36, the passing ratio of each wavelength in the light display is expressed in terms of the brightness by setting the retardation $d_{eff} \cdot \Delta n$ (μm) as a parameter. As seen from FIG. 36, the brightness in the short wavelength region (blue region) less than 500 nm extremely changes and is remarkably reduced by a small change in the retardation $d_{eff} \cdot \Delta n$.

It is important to maintain the relationship of the transmittance between the three wavelengths of the colors R, G and B to a predetermined state.

The predetermined state refers to a state wherein transmittance in the wavelength of the longest wave among the spectra corresponding to blue of the emission spectra of the backlight is always larger than that in the wavelengths 545 nm (green) and 630 nm (red).

Accordingly, the present invention must satisfy the condition that the above relationship is always maintained.

What is claimed is:

1. A liquid crystal display apparatus comprising:
a liquid crystal panel including a pair of polarizers; and
a back light having a light source provide at a back side of said liquid crystal panel for illumination thereof;
wherein said liquid crystal panel is an active matrix type liquid crystal panel enabling display in a double refraction mode, and has a characteristic of spectral transmittance required to satisfy the following equation, x>y>z, when a medium tone display voltage varies in a range between a minimum voltage and a maximum voltage for a Blue pixel, where:
"x" is a value of the transmittance in said liquid crystal panel at a wavelength which corresponds to a longest wavelength in a range of wavelengths designated for blue light illuminated from said light source;
"y" is a value of the transmittance in said liquid crystal panel at a wavelength which corresponds to a maximum value of the intensity in a range of wavelengths designated for green light illuminated from said light source; and
"z" is a value of the transmittance in said liquid crystal panel at a wavelength which corresponds to a maximum value of the intensity in a range of wavelengths designated for red light illuminated from said light source.

2. A liquid crystal display apparatus comprising:
a light crystal panel including a pair of polarizers; and
a back light having a light source provided at a back side of said liquid crystal panel for illumination thereof;
wherein said liquid crystal panel is an active matrix type liquid crystal panel enabling display in a double refraction mode, and has a characteristic of spectral transmittance required to satisfy the following equation, x>y>z, when a medium tone display voltage, which varies in the range of overlapped voltages among medium tone display voltages for each pixel of Red, Green and Blue pixels, is applied from a signal line drive circuit to a signal electrode for each pixel of the Red, Green and Blue pixels, where:
"x" is a value of the transmittance in said liquid crystal panel at a wavelength which corresponds to a longest wavelength in a range of wavelengths designated for blue light illuminated from said light source;
"y" is a value of the transmittance in said liquid crystal panel at a wavelength which corresponds to a maximum value of intensity in a range of wavelengths designated for green light illuminated from said light source; and
"z" is a value of the transmittance in said liquid crystal panel at a wavelength which corresponds to a maximum value of intensity in a range of wavelengths designated for red illuminated from said light source.

3. A liquid crystal display apparatus comprising:
a liquid crystal panel including a pair of polarizers; and
a back light having a light source provided at a back side of said liquid crystal panel for illumination thereof;
wherein said liquid crystal panel is an active matrix type liquid crystal panel enabling display in a double refraction mode, and has a characteristic of spectral transmittance required to satisfy the following equation, x>y>z, when a medium tone display voltage, which varies from a minimum medium tone display voltage to a maximum medium tone display voltage, is applied for each pixel of Red, Green and Blue pixels, where:
"x" is a value of the transmittance in said liquid crystal panel at a wavelength which corresponds to a longest wavelength in a range of wavelengths designated for blue light illuminated from said light source;
"y" is a value of the transmittance in said liquid crystal panel at a wavelength which corresponds to a maximum value of intensity in a range of wavelengths designated for green light illuminated from said light source; and
"z" is a value of the transmittance in said liquid crystal panel at a wavelength which corresponds to a maximum value of intensity in a range of wavelengths designated for red light illuminated from said light source.

* * * * *